United States Patent
Sanoner et al.

(10) Patent No.: US 12,173,866 B2
(45) Date of Patent: Dec. 24, 2024

(54) INTELLIGENT SOLAR POWERED LAMPS AND METHODS OF CONTROLLING OPERATION OF THE SAME

(71) Applicant: Solstice Innovations Limited, Hong Kong (CN)

(72) Inventors: Hugues Marie Rene Fernand Sanoner, Hong Kong (CN); Geofrey Mickael Denis Marcel, Ventabren (FR); Man Kwong Ng, Hong Kong (CN)

(73) Assignee: Solstice Innovations Limited, Hong Kong (CN)

( * ) Notice: Subject to any disclaimer, the term of this patent is extended or adjusted under 35 U.S.C. 154(b) by 0 days.

(21) Appl. No.: 18/463,374

(22) Filed: Sep. 8, 2023

(65) Prior Publication Data

US 2024/0084985 A1    Mar. 14, 2024

Related U.S. Application Data

(60) Provisional application No. 63/375,059, filed on Sep. 9, 2022.

(51) Int. Cl.
*F21S 9/00* (2006.01)
*F21S 9/03* (2006.01)
(Continued)

(52) U.S. Cl.
CPC .............. *F21S 9/037* (2013.01); *F21V 15/01* (2013.01); *F21V 23/003* (2013.01);
(Continued)

(58) Field of Classification Search
CPC .......... F21S 9/037; H02S 20/20; H02S 20/32; H02S 40/38; H05B 45/14; H02J 7/007194; H02J 7/0048; H02J 7/0071
See application file for complete search history.

(56) References Cited

U.S. PATENT DOCUMENTS

| 2012/0200235 A1* | 8/2012 | Shuy | H05B 47/28 315/307 |
|---|---|---|---|
| 2017/0089533 A1 | 3/2017 | Souvandy | |

(Continued)

FOREIGN PATENT DOCUMENTS

| CN | 102550519 A | 7/2012 |
|---|---|---|
| CN | 202852659 U | 4/2013 |

(Continued)

OTHER PUBLICATIONS

"What is solar PV I-V curve tracing?", [online] [retrieved on Nov. 3, 2023] retrieved from Internet <URL: https://www.seaward.com/gb/support/solar/faqs/84179-what-is-solar-pv-i-v-curve-tracing/>; published from Sep. 26, 2020-Nov. 3, 2023; p. 1.

*Primary Examiner* — Gerald J Sufleta, II
(74) *Attorney, Agent, or Firm* — EAGLE IP LIMITED

(57) ABSTRACT

In certain embodiments, provided is intelligent solar powered lamps and methods of controlling operation of the same. In one example, the intelligent solar powered lamp comprises a LED component; a solar panel component; a battery component; a converter that operatively connects with the LED component, solar panel component and the battery component; and a microcontroller that operatively connects with the battery component and electrically communicates with the converter. In some embodiments, the microcontroller comprises a memory that stores an executable, software program configured to control the operation of the lamp. Other embodiments are described herein. In certain embodiments, the intelligent solar powered lamps provide an intelligent mode which utilizes machine learning technologies to optimize operations and to maximize performance and user experience.

15 Claims, 15 Drawing Sheets

(51) Int. Cl.

| | |
|---|---|
| *F21V 15/01* | (2006.01) |
| *F21V 23/00* | (2015.01) |
| *F21V 23/04* | (2006.01) |
| *H02J 7/00* | (2006.01) |
| *H02S 20/20* | (2014.01) |
| *H02S 20/32* | (2014.01) |
| *H02S 40/38* | (2014.01) |
| *H05B 45/14* | (2020.01) |
| *F21Y 115/10* | (2016.01) |

(52) U.S. Cl.
CPC ........ *F21V 23/0457* (2013.01); *H02J 7/0048* (2020.01); *H02J 7/0071* (2020.01); *H02J 7/007194* (2020.01); *H02S 20/20* (2014.12); *H02S 20/32* (2014.12); *H02S 40/38* (2014.12); *H05B 45/14* (2020.01); *F21Y 2115/10* (2016.08)

(56) References Cited

U.S. PATENT DOCUMENTS

| | | | | |
|---|---|---|---|---|
| 2017/0324345 | A1* | 11/2017 | Stuler | H02M 1/08 |
| 2017/0347779 | A1* | 12/2017 | Sobbi | A45F 5/021 |
| 2018/0128438 | A1* | 5/2018 | Sreshta | F21V 15/012 |
| 2019/0137056 | A1* | 5/2019 | Sreshta | H02J 7/0047 |

FOREIGN PATENT DOCUMENTS

| | | |
|---|---|---|
| CN | 205657885 U | 10/2016 |
| CN | 106304490 A | 1/2017 |
| CN | 110392470 A | 10/2019 |

* cited by examiner

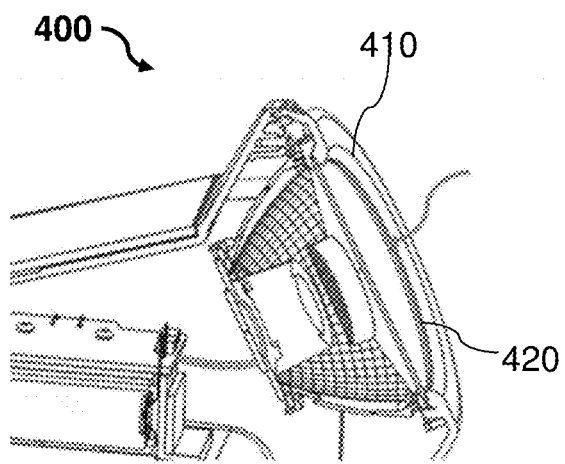# 
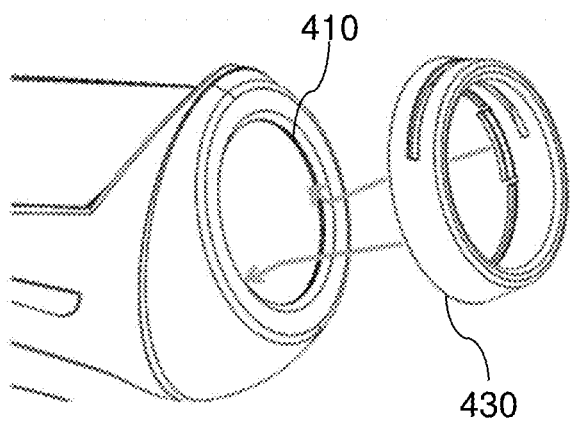
Fig. 4A
Fig. 4B
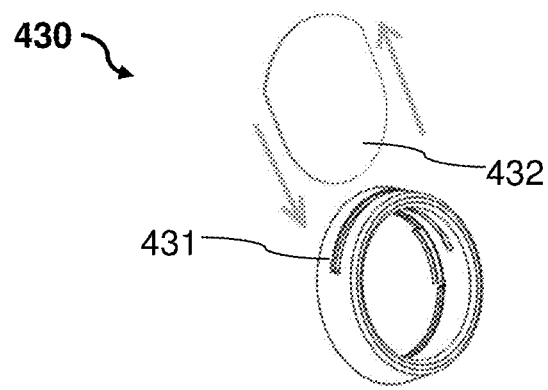
Fig. 4C

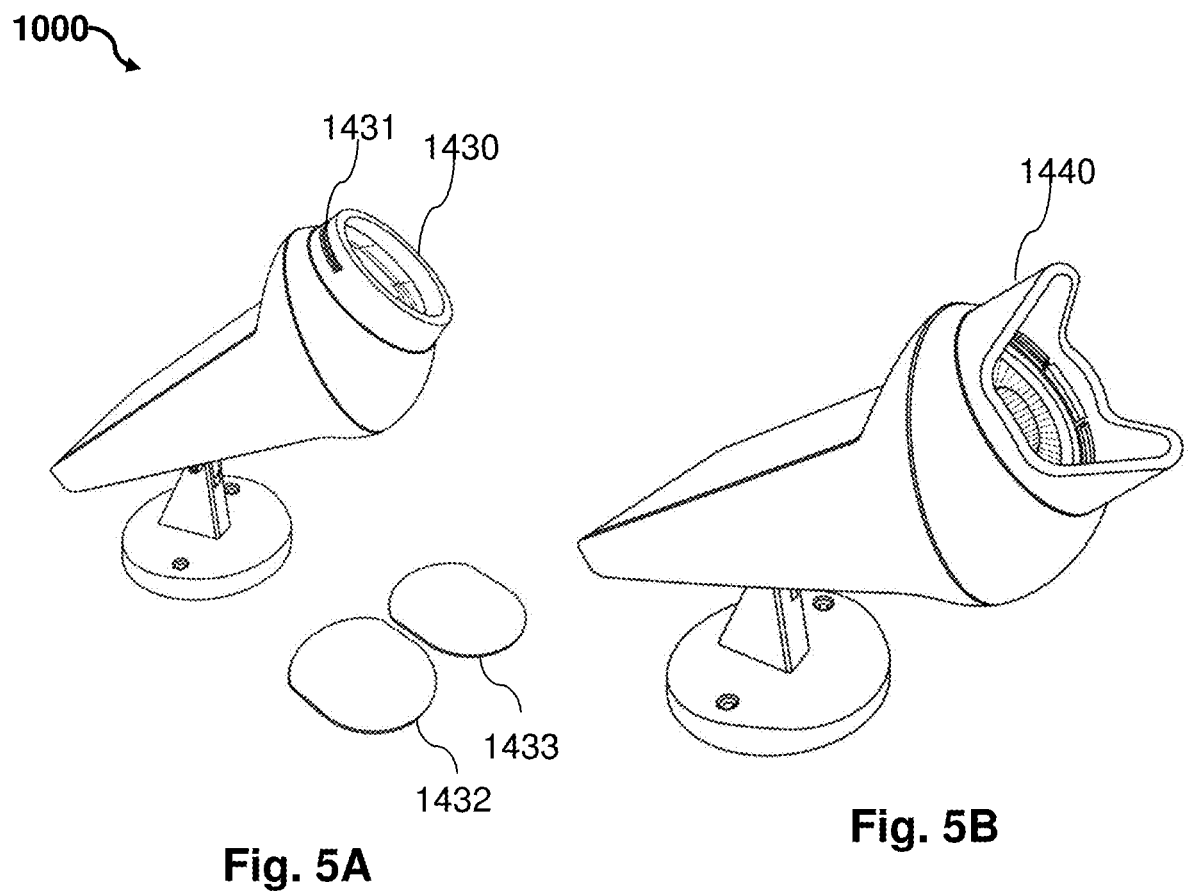
Fig. 5A
Fig. 5B
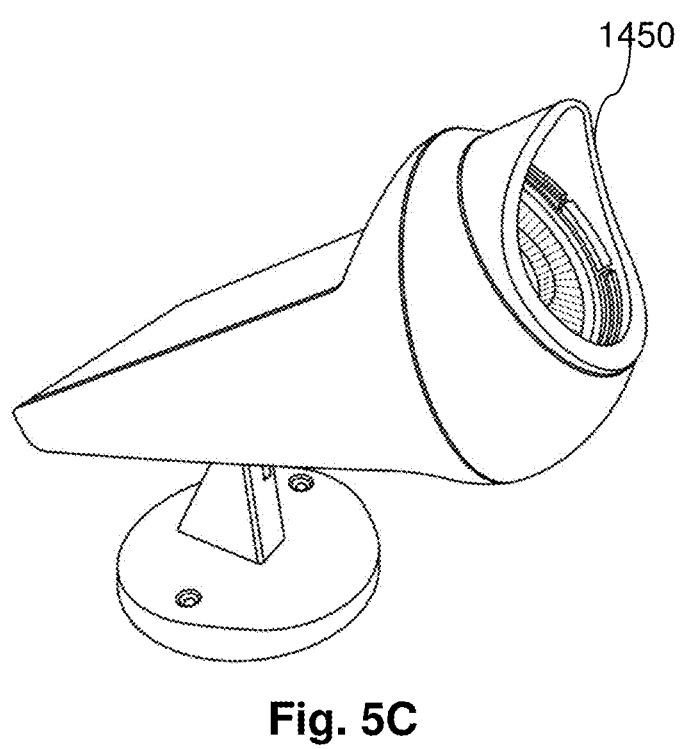
Fig. 5C

INTELLIGENT SOLAR POWERED LAMPS AND METHODS OF CONTROLLING OPERATION OF THE SAME

CROSS-REFERENCE TO RELATED APPLICATION

This application claims benefit under 35 U.S.C. § 119(e) of U.S. Provisional application having Ser. No. 63/375,059 filed on Sep. 9, 2022, the entire contents of which are hereby incorporated by reference herein.

FIELD OF INVENTION

This application relates to lamps. More specifically, the present invention relates to solar powered devices, lamps and systems thereof and methods of operating the same.

BACKGROUND OF INVENTION

Energy conservation is of high importance because it helps reduce our reliance on fossil fuels, minimizes environmental impact, and promotes sustainability of our future. Solar-powered devices are one of the promising solutions for efficient lighting as they utilize renewable solar energy. However, serious problems and drawbacks associated with solar-powered lamps have been encountered. For example, their performance depends highly on sunlight availability, making them less reliable in areas with limited sunlight or during cloudy days. For example, the lighting autonomy at night is directly dependent on the battery charging capacity from the previous day, creating huge fluctuation in terms of lighting hours per night from day to day. For example, the production cost and manpower of solar-powered lamps is much more expensive compared to traditional lamps for example, because of the complexity of the structure, which may hinder their widespread adoption. Accordingly, there is a great need for improved solar powered lamps, systems and methods of controlling operation of the same.

SUMMARY OF INVENTION

In light of the foregoing background, in certain embodiments, it is an object to provide intelligent solar powered lamps, systems thereof and methods of controlling operation of the same.

Accordingly, in one aspect, provided is an intelligent solar powered lamp, including: a LED component; a solar panel component; a battery component; a converter that operatively connects with the LED component, solar panel component and the battery component; and a microcontroller that operatively connects with the battery component and electrically communicate with the converter, wherein the microcontroller includes a memory that stores an executable, software program configured to control the operation of the lamp.

In another aspect, provided is method of controlling operation of the intelligent solar powered lamp, comprising the steps of: (1) determining whether current voltage at solar panel component is lower than a pre-defined low voltage; (2) if lower, determining whether a current time has reached a first predetermined period before a saved night start time; (3) if reached, (3.1) saving the current time as a current night start time and a current battery level as a current battery start level, (3.2) calculating an expected battery usage by one or more of the following parameters: the current battery start level; a saved battery end level; a saved battery usage; and/or a target battery end level; and (3.3) calculating an expected average LED lumen level by the following parameters: an expected night length calculated from the current night start time and a saved night end time; an expected efficiency; and/or the expected battery usage from (3.2); (4) providing power to LED component based on the expected average LED lumen level; (5)

determining whether a current voltage at the solar panel component is higher than a pre-defined high voltage; (6) if higher, determining whether a current time has reached a second predetermined period before the saved night end time; (7) if reached, (7.1) saving the current time from (6) as a current night end time and a current battery level as a current battery end level, (7.2) estimating a new expected night length by calculating and filtering a current night length based on the current night start time and the current night end time, (7.3) estimating a new expected efficiency by calculating and filtering a current efficiency based on current battery usage calculated from current battery start level, current battery end level, and the current night length; and (8) turning off the LED component and proceeding with step (1).

Other example embodiments will be described below.

Advantages

There are many advantages of the present disclosure. In some embodiments, provided devices and systems are whole and compact in design. In some embodiments, provided devices and systems have angle locking mechanism for anti-drooping features. In some embodiments, provided devices and systems have ergonomic multi-terrain anchoring base design that allows the lamp easier to install and relocate. In some embodiments, provided devices and systems allow changing the lighting atmosphere to a multitude of various colors with filter mount.

In some embodiments, the provided devices, systems, and methods feature an intelligent mode which utilizes machine learning technologies to optimize operations and to maximize performance and user experience.

In some embodiments, the provided devices, systems, and methods guarantee uninterrupted lighting all night long, which can be comparable to a cabled outdoor light.

In some embodiments, the provided devices, systems, and methods adjust and optimize the lumen output automatically and intelligently. In some embodiments, the provided devices, systems, and methods include all the necessary settings without the need for manual management.

In some embodiments, the provided devices and methods include sophisticated algorithms in the intelligent mode which take into consideration of multiple factors, including but not limited to: a) the current battery charge; b) the average long term charging memory of the device; c) historical charging data collected from similar devices at various locations and results from simulation on this data set; and d) the current wear of the light battery and converters, updated every day through self-assessment. In some embodiments, the lumen level and the lumen output distribution is determined automatically in the intelligent mode by extrapolation at least based on how much battery capacity it can afford to use up that night.

In some embodiments, the provided devices, systems, and methods include a lifelong average charging memory which allows for prediction of when the sun will rise the following morning, and hence determining the next night duration.

In some embodiments, the provided devices, systems, and methods calculate the number of hours it needs to light up the following night and set its own lumen output for that night duration at any given date.

In some embodiments, the provided devices, systems, and methods calculate the night duration of the coming night and set its own average lumen output for the night. For example, the lumen output can be set to 10, 20, 30, 40, 50, 100, 200, 300, 400, 500, 600, 700, or 800 lumens or more.

In some embodiments, the provided devices, systems, and methods automatically distribute battery usage based on a programmed formula to adjust lumen output distribution during the night which aligns with the time when people require light the most.

In some embodiments, the provided devices, systems, and methods minimize lumen output variations from night to night by saving up extra energy when it produces an above average energy quantity to be used later when production will be below average, which allows for all night long lighting even with several days in a row of bad weather, and more generally a more desirable stable performance.

In some embodiments, the provided devices, systems, and methods store at least one or more of the relevant data and setting as mentioned above in a persistent memory to allow the light to recover faster to a stable lumen output even if the device and/or system is turned off manually by the user.

In some embodiments, the provided devices and systems includes features against overheating and potential accidental fire and will allow battery life span extension and optimization.

In some embodiments, the provided devices, systems and methods include a "Max Charge" system which will maximize the solar panel energy collection and battery charge using a maximum power point tracking (MPPT) program to maximize solar panel energy collection by the solar panel component.

In some embodiments, the provided devices, systems and methods include a step-down converter to optimize the alignment of the solar panel and battery voltage.

In some embodiments, the provided devices, systems and methods include a microcontroller unit (MCU) which centralizes the three functions of battery management, LED driving and solar panel in one single, integral unit, resulting in a more cost effective and more space efficient device and/or system as it involves fewer components and moving parts. In some embodiments, the MCU centralizes four functions of battery management, LED driving, solar panel and/or USB charging.

In some embodiments, the provided devices, systems and methods maximize lumen output and direct maximum energy to the LED while minimizing energy loss from heat dissipation up to at least 600, 700, or 800 lumens or more.

In some embodiments, the provided devices, systems and methods include a novel "3-in-1 Multiplex convertor" which is a single integral converter component used to switch on the LEDs, to recharge battery with solar panel, and/or to recharge battery with USB charger.

In some embodiments, the provided devices and methods include a MCU driven user interface, allowing a user to monitor and/or control mode selection, innovative light intensity selection with continuous dimming, and/or fuel gauge indicator. In some embodiments, the fuel gauge indicator provides a user the battery charge status when charging by either the solar panel or the USB charger, hence eliminating the need of relying on a separate specific battery status integrated circuit (IC). In some embodiments, a low battery indication is provided to the user while the light is on, once the battery level reaches 5%, 10%, 15%, 20%, 25%, 30%, 35%, 40%, 45%, 50%, 55%, 60%, 65% or more of the battery capacity.

In some embodiments, the provided devices and methods include an anti-tamper mode which allows a user to "lock" the chosen Mode such as Intelligent mode. This responds to a strong need from users such as in hotels, restaurants, resorts etc. as it allows for the device to be set once and for all and to stay in the preset mode. Unintended persons such as customers, children, and the curious are therefore prevented from tampering with the light system settings, saving a great amount of time as staff will not need to reset all lamps in case they would have been tampered with.

In some embodiments, the provided devices and methods is capable of providing illumination for 1, 2, 3, 4, 5, 6, 7, 8, 9, 10, 11, 12, 13, 14, 15, 16, 17, 18, 19, 20 or more hours by setting itself up for the upcoming night to ensure full light of optimal illumination based on its current battery charge and automatically adjusting brightness.

In some embodiments, the provided devices and methods determine the current season it is in. In some embodiments, the provided devices and methods store the previous life charging history in the memory.

BRIEF DESCRIPTION OF FIGURES

FIGS. 4A-4C illustrate the front cap replacement mechanism and filter mount of an example intelligent solar powered lamp according to an example embodiment.

FIGS. 5A-5C illustrate another example intelligent solar powered lamp with filter mounts according to an example embodiment.

DETAILED DESCRIPTION

Definitions

Figure 1:
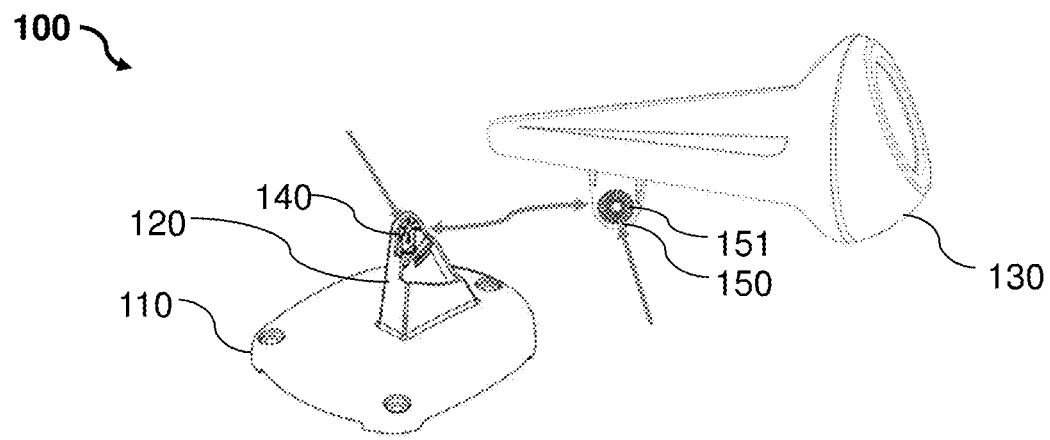
FIG. 1 shows an example intelligent high intensity solar powered lamp with an angle locking mechanism according to an example embodiment.

As used herein and in the claims, the terms "comprising" (or any related form such as "comprise" and "comprises"), "including" (or any related forms such as "include" or "includes"), "containing" (or any related forms such as "contain" or "contains"), means including the following elements but not excluding others. It shall be understood that for every embodiment in which the term "comprising" (or any related form such as "comprise" and "comprises"), "including" (or any related forms such as "include" or "includes"), or "containing" (or any related forms such as "contain" or "contains") is used, this disclosure/application also includes alternate embodiments where the term "comprising", "including," or "containing," is replaced with "consisting essentially of" or "consisting of". These alternate embodiments that use "consisting of" or "consisting essentially of" are understood to be narrower embodiments of the "comprising", "including," or "containing," embodiments.

For the sake of clarity, "comprising", "including", "containing" and "having", and any related forms are open-ended terms which allows for additional elements or features beyond the named essential elements, whereas "consisting of" is a closed end term that is limited to the elements recited in the claim and excludes any element, step, or ingredient not specified in the claim.

For the sake of clarity, "characterized by" or "characterized in" (together with their related forms as described above), does not limit or change the nature of whether the list of terms following it are open or closed. For example, in a claim directed towards "a device comprising A, B, C, and characterized by D, E, and F", the elements D, E, and F are still open-ended terms and the claim is meant to include other elements due to the use of the word "comprising" earlier in the claim.

As used herein, the singular forms "a", "an" and "the" are intended to include the plural forms as well, unless the context clearly indicates otherwise. Where a range is referred in the specification, the range is understood to include each discrete point within the range. For example, 1-7 means 1, 2, 3, 4, 5, 6, and 7.

As used herein, the term "about" is understood as within a range of normal tolerance in the art and not more than ±10% of a stated value. By way of example only, about 50 means from 45 to 55 including all values in between. As used herein, the phrase "about" a specific value also includes the specific value, for example, about 50 includes 50.

As used herein and in the claims, the terms "general" or "generally", or "substantial" or "substantially" mean that the recited characteristic, angle, shape, state, structure, or value need not be achieved exactly, but that deviations or variations, including for example, tolerances, measurement error, measurement accuracy limitations and other factors known to those of skill in the art, may occur in amounts that do not preclude the effect the characteristic was intended to provide. For example, an object that has a "generally" cylindrical shape would mean that the object has either an exact cylindrical shape or a nearly exact cylindrical shape. In another example, an object that is "substantially" perpendicular to a surface would mean that the object is either exactly perpendicular to the surface or nearly exactly perpendicular to the surface, e.g., has a 5% deviation.

It is to be understood that terms such as "top", "bottom", "middle", "side", "length", "inner", "outer", "interior", "exterior", "outside", "vertical", "horizontal" and the like as may be used herein, merely describe points of reference and do not limit the present invention to any particular orientation or configuration. Further, terms such as "first," "second," "third," etc., merely identify one of a number of portions, components and/or points of reference as disclosed herein, and likewise do not limit the present invention to any particular configuration or orientation.

As used herein and in the claims, terms "first", "second", "third", "fourth" etc. may be used herein to describe various limitations, elements, components, regions, layers and/or sections, these limitations, elements, components, regions, layers and/or sections should not be limited by these terms. These terms are only used to distinguish one limitation, element, component, region, layer or section from another limitation, element, component, region, layer or section. Thus, a first limitation, element, component, region, layer or section discussed below could be termed a second limitation, element, component, region, layer or section without departing from the teachings of the present application.

As used herein, the term "lamp" refers to a device, an apparatus, or lighting system that can emit light. As used herein, the term "solar powered lamp" is a lamp that can use solar energy to generate electricity and emit light, such as through the use of photovoltaic or solar panels and rechargeable batteries. For clarity sake, the lamp can also use other energy source(s) to emit light, for example, external power source provided by USB interface.

As used herein, the term "Light-Emitting Diode (LED)" refers a semiconductor element, component or a device that emits light when an electric current passes through it. LED component may contain one or more LEDs.

As used herein, the term "solar panel" is an element, component or a device that converts sunlight into electricity by using photovoltaic (PV) cells.

As used herein, the term "battery" is a source of electric power containing one or more electrochemical cells with external connections for powering electrical devices such as LED component. In certain embodiments, the battery used is rechargeable.

As used herein, the term "converter" is an element or a component configured to switch the power path between other different operatively connected elements or components. For example, a converter can connect an energy source (for example, from solar panel or other external power source) to the battery for energy storage or switch to draw power from the battery (or other external power source) to power the LED component.

As used herein, the term "MOSFET half-bridge based converter" is a converter that uses metal-oxide-semiconductor field-effect transistors (MOSFETs) in a half-bridge configuration.

As used herein, the term "microcontroller" is an integrated circuit element that contains components such as a microprocessor and a memory (e.g., non-volatile computer readable storage media) that stores a program software or a firmware to control and manage other electronic components, elements, systems and devices.

As used herein, the term "MPPT" refers to maximum power point tracking which is an algorithm or a software program used to maximize the solar panel energy collection by continuously monitoring and adjusting the voltage and current to find the optimal point of power for battery charging.

As used herein, the term "solar panel mode" refers to the mode when the solar panel is outputting power to charge the battery. When solar panel voltage is higher than battery voltage, the system switches to solar panel mode, and switches out of it when it is no longer able to draw power from solar panel. When not in solar panel mode, the system tracks the solar panel open voltage.

As used herein, the term "operatively connect(s) with" or "in operative connection" indicates that two or more elements are connected in a functional manner to enable their cooperative operation or interaction. Such connection may be directly or indirectly connection, and may be or may not be in physical and/or in electrical connection.

As used herein, the term "in electrical communication" or "electrically connects with" refers to the transmission of information or signals through electrical means. Electrical communication can take various forms, such as wired connections (e.g., cables) or wireless transmission (e.g., Wi-Fi, Bluetooth).

As used herein, the phrase "in electrical connection" or "electrically connects with" refers to an electrical link between two or more electrical elements, components or devices.

As used herein, when the term "filtering" is used in the context of "filtering" a certain value, it refers to a process of examining a dataset to exclude, rearrange, or apportion data according to certain criteria or conditions to improve the quality or relevance of the dataset. In some embodiments, filtering involves preprocessing and manipulation of the data such as to improve the performance and accuracy of the model. For example, if a new data is "filtered" into the dataset, the new data will be processed together with the saved data in the dataset to find patterns and to extend them into future predictions.

As used herein, a saved value (e.g., saved battery start level, saved battery end level, saved battery usage, saved night end time, saved LED lumen level, etc.) can be pre-set, pre-defined or pre-saved initial value(s), one or more values obtained or calculated from the previous or historical day/night, and/or an average value of the values obtained or calculated from the previous (non-filtered) consecutive days/nights over a period of defined time. The previous or historical data may have been filtered or selected before saved.

As used herein, a current value (e.g., current night start time, current battery start level, current night end time, current night length, current efficiency, current voltage, current time, etc.) is the present or real time value obtained at the current instance. It can be saved and become the saved value of the next day/night.

As used herein, an expected value (e.g., expected battery usage, expected night length etc.) is a calculated value determined by extrapolation based on the current and/or saved values obtained or calculated from the previous consecutive days/nights over a period of defined time. Calculated values can be saved or not saved for future use.

As used herein, a target value (e.g. target battery end level) is a pre-defined desired or ideal target value. For example, the target value can be 10%, 20%, 30%, 40%, 50%, 60%, 70%, 80%, 90% or more.

For sake of clarity, the value as described above can be any parameters such as voltage, current, power, day/night start/end time, duration, day/night start/end battery level, efficiency, and others.

For sake of clarity, the night length of a given night is calculated as the time difference between the night end time and the night start time of the same night.

For sake of clarity, the battery usage of a given night is calculated by subtracting a battery start level and a battery end level of the same night. In some examples, the battery usage is represented as a percentage value of the full battery level.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited.

In some embodiments, provided is an intelligent solar powered lamp, including: a LED component; a solar panel component; a battery component; a converter that operatively connects with the LED component, solar panel component and the battery component; and a microcontroller that operatively connects with the battery component and electrically communicates with the converter, wherein the microcontroller includes a memory that stores an executable, software program configured to control the operation of the lamp.

In some embodiments, the converter is a MOSFET half-bridge based converter.

In some embodiments, the microcontroller further includes a battery management system (BMS) that is configured to control the battery component, a LED driver system that is configured to control the LED component, and a solar panel driver system that is configured to control the solar panel component.

In some embodiments, the microcontroller further includes a temperature sensor for measuring battery temperature of the battery component, such that the BMS is configured to control charging of the battery component in response to the battery temperature.

In some embodiments, the software program further includes: a fuel gauge indicator system configured to indicate battery charging status of the battery component; and/or a dimming unit system configured to control lighting lumen output of the LED component.

In some embodiments, the lamp further includes: a housing that houses or supports the LED component, the solar panel component, the battery component, the converter, and the microcontroller; a base; and a neck portion extending away from the base; wherein the neck portion includes a plurality of interlocking teeth, and the housing includes a groove dial including a plurality of grooves adapted to interact with the plurality of interlocking teeth, such that when the housing is connected to the neck portion, each of the interlocking teeth mates with one of the groove to secure the position of the housing relative to the base.

In some embodiments, the housing further includes a front cap opening, and the intelligent solar powered lamp further includes a filter mount attachable to the front cap opening, wherein the filter mount includes a slot to receive at least one filter.

In some embodiments, the software program further includes a Maximum Power Point Tracking (MPPT) system configured to maximize solar panel energy collection by the solar panel component.

In some embodiments, the MPPT system executes the following steps: (a) determining whether sunlight is detected by the solar panel; (b) if detected, decreasing working voltage of the solar panel component; (c) determining whether charging power of the battery component is increased; (d) if increased, proceeding with step (b); otherwise, proceeding with step (e); (e) determining whether sunlight is still detected by the solar panel; (f) if detected, increasing the working voltage; otherwise, stop charging the battery; (g) determining whether the charging power is increased; (h) if increased, proceeding with step (f), otherwise, proceeding with step (i); (i) determining if sunlight is still detected; and (j) if detected, proceeding with step (b); otherwise, stop charging the battery, such that solar panel energy collection is maximized.

In some embodiments, the lamp further includes a button that operatively connects with the microcontroller, wherein the software program is further configured to allow the lamp to be switchable between an intelligent mode that optimizing LED lumen level in response to at least battery usage, a preset usage mode that allows a user to manually control the operation or to customize the parameters of the lamp, and an anti-tamper mode that prevents a user to change current setting of the lamp.

In some embodiments, the software program further executes the following steps: (i) proceeding with the intelligent mode and determining whether the button is shortly pressed or prolongedly pressed and released afterwards; (ii) if shortly pressed, proceeding with a preset usage mode; if prolongedly pressed and released afterwards, proceeding with the anti-tamper mode; (iii) determining whether the button is further prolongedly pressed and released afterwards; and (iv) if prolongedly pressed and released afterwards, proceeding with step (i).

In some embodiments, the software program further including a step of: operating an indicator to fast blink, if step (ii) and/or step (iv) is prolongedly pressed until released.

In some embodiments, the operating module is configured to control the operation of the lamp in an intelligent mode by executing the following steps: (1) determining whether a current voltage at solar panel component is lower than a pre-defined low voltage; (2) if lower, determining whether a current time has reached a first predetermined period before a saved night start time; (3) if reached, (3.1) saving the current time as a current night start time and a current battery level as a current battery start level, (3.2) calculating an expected battery usage by one or more of the following parameters: the current battery start level; a saved battery end level; a saved battery usage; and/or a target battery end level; and (3.3) calculating an expected average LED lumen level by the following parameters: an expected night length calculated from the current night end time and a saved night start time; an expected efficiency; and/or the expected battery usage from (3.2); (4) providing power to LED component based on the expected average LED lumen level; (5) determining whether a current voltage at the solar panel component is higher than a pre-defined high voltage; (6) if higher, determining whether a current time has reached a second predetermined period before the saved night end time; (7) if reached, (7.1) saving the current time from (6) as a current night end time and a current battery level as a current battery end level, (7.2) estimating a new expected night length by calculating and filtering a current night length based on the current night start time and the current night end time, (7.3) estimating a new expected efficiency by calculating and filtering a current efficiency based on current battery usage calculated from current battery start level, current battery end level, and the current night length; and (8) turning off the LED component and proceeding with step (1).

In some embodiments, step (4) further including steps of: (4.1) providing a first power to LED component at an enhanced LED lumen level, from night start time to midnight time; (4.2) providing a second power to LED component at a reduced LED lumen level, from midnight time to dawn time; and (4.3) providing the first power to LED component at an enhanced LED lumen level, from dawn time to sunrise time.

In some embodiments, step (3) further including steps of: if not reached, (3.4) determining a sum of day length and night length on the same date, and determining whether the sum is more than a predetermined time; (3.5) if more than the predetermined time, rebooting the lamp and proceeding with step (1); otherwise, proceeding with step (4).

In some embodiments, step (7) further including steps of: if not reached, (7.7) determining a sum of day length and night length on the same date, and determining whether the sum is for more than a predetermined time; (7.8) if more than the predetermined time, rebooting the lamp and proceeding with step (1); otherwise, proceeding with step (8).

In some embodiments, provided is a method of controlling operation of the intelligent solar powered lamp as described in any one of the preceding embodiments, including the steps of: (1) determining whether a current voltage at solar panel component is lower than a pre-defined low voltage; (2) if lower, determining whether a current time has reached a first predetermined period before a saved night start time; (3) if reached, (3.1) saving the current time as a current night start time and a current battery level as a current battery start level, (3.2) calculating an expected battery usage by one or more of the following parameters: the current battery start level; a saved battery end level; a saved battery usage; and/or a target battery end level; and (3.3) calculating an expected average LED lumen level by the following parameters: an expected night length calculated from the current night start time and a saved night end time; an expected efficiency; and/or the expected battery usage from (3.2); (4) providing power to LED component based on the expected average LED lumen level; (5) determining whether a current voltage at the solar panel component is higher than a pre-defined high voltage; (6) if higher, determining whether a current time has reached a second predetermined period before the saved night end time; (7) if reached, (7.1) saving the current time from (6) as a current night end time and a current battery level as a current battery end level, (7.2) estimating a new expected night length by calculating and filtering a current night length based on the current night start time and the current night end time, (7.3) estimating a new expected efficiency by calculating and filtering a current efficiency based on current battery usage calculated from current battery start level, current battery end level, and the current night length; and (8) turning off the LED component and proceeding with step (1).

In some embodiments, provided is a method, wherein step (4) further including steps of: (4.1) providing a first power to LED component at an enhanced LED lumen level, from night start time till midnight time; (4.2) providing a second power to LED component at a reduced LED lumen level, from midnight time to dawn time; and (4.3) providing the first power to LED component at an enhanced LED lumen level, from dawn time to sunrise time.

In some embodiments, provided is a method, wherein step (3) further including steps of: if not reached, (3.4) determining a sum of day length and night length on the same date, and determining whether the sum is more than a predetermined time; (3.5) if more than the predetermined time, rebooting the lamp and proceeding with step (1); otherwise, proceeding with step (4).

In some embodiments, provided is a method, wherein step (7) further including steps of: if not reached, (7.7) determining a sum of day length and night length on the same date, and determining whether the sum is for more than a predetermined time; (7.8) if more than the predetermined time, rebooting the lamp and proceeding with step (1); otherwise, proceeding with step (8).

Although the description referred to particular embodiments, the disclosure should not be construed as limited to the embodiments set forth herein.

Numbered Embodiments

Embodiment 1. An intelligent solar powered lamp, comprising: a LED component; a solar panel component; a battery component; a converter that operatively connects with the LED component, solar panel component and the battery component; and a microcontroller that operatively connects with the battery component and electrically communicate with the converter, wherein the microcontroller comprises a memory that stores an executable, software program configured to control the operation of the lamp.

Embodiment 2. The lamp of any one of the preceding embodiments, wherein the converter is a MOSFET half-bridge based converter.

Embodiment 3. The lamp of any one of the preceding embodiments, wherein software program further comprises a battery management system (BMS) that is configured to control the battery component, a LED driver system that is configured to control the LED component, and a solar panel driver system that is configured to control the solar panel component.

Embodiment 4. The lamp of any one of the preceding embodiments, wherein the microcontroller further comprises a temperature sensor for measuring battery temperature of the battery component, such that the BMS is configured to control charging of the battery component in response to the battery temperature.

Embodiment 5. The lamp of any one of the preceding embodiments, wherein the software program further comprises: a fuel gauge indicator system configured to indicate battery charging status of the battery component; and/or a dimming unit system configured to control lighting lumen output of the LED component.

Embodiment 6. The lamp of any one of the preceding embodiments, further comprising: a housing that houses or supports the LED component, the solar panel component, the battery component, the converter, and the microcontroller; a base; and a neck portion extending away from the base; wherein the neck portion comprises a plurality of interlocking teeth, and the housing comprises a groove dial comprising a plurality of grooves adapted to interact with the plurality of interlocking teeth, such that when the housing is connected to the neck portion, each of the interlocking teeth mates with one of the groove to secure the position of the housing relative to the base.

Embodiment 7. The lamp of any one of the preceding embodiments, wherein the housing further comprises a front cap opening, and the intelligent solar powered lamp further comprises a filter mount attachable to the front cap opening, wherein the filter mount comprises a slot to receive at least one filter.

Embodiment 8. The lamp of any one of the preceding embodiments, wherein the software program further comprises a Maximum Power Point Tracking (MPPT) system configured to maximize solar panel energy collection by the solar panel component.

Embodiment 9. The lamp of any one of the preceding embodiments, wherein the MPPT system executes the following steps: (a) determining whether sunlight is detected by the solar panel; (b) if detected, decreasing working voltage of the solar panel component; (c) determining whether charging power of the battery component is increased; (d) if increased, proceeding with step (b); otherwise, proceeding with step (e); (e) determining whether sunlight is still detected by the solar panel; (f) if detected, increasing the working voltage; otherwise, stop charging the battery; (g) determining whether the charging power is increased; (h) if increased, proceeding with step (f), otherwise, proceeding with step (i); (i) determining if sunlight is still detected; and (j) if detected, proceeding with step (b); otherwise, stop charging the battery, such that solar panel energy collection is maximized.

Embodiment 10. The lamp of any one of the preceding embodiments, further comprising a button that operatively connects with the microcontroller, wherein the software program is further configured to allow the lamp to be switchable between an intelligent mode that optimizing LED lumen level in response to at least battery usage, a preset usage mode that allows a user to manually control the operation or to customize the parameters of the lamp and an anti-tamper mode that prevents a user to change current setting of the lamp.

Embodiment 11. The lamp of any one of the preceding embodiments, wherein the software program further executes the following steps: (i) proceeding with the intelligent mode and determining whether the button is shortly pressed or prolongedly pressed and released afterwards; (ii) if shortly pressed, proceeding with the preset usage mode; if prolongedly pressed and released afterwards, proceeding with the anti-tamper mode; (iii) determining whether the button is further prolongedly pressed and released afterwards; and (iv) if prolongedly pressed and released afterwards, proceeding with step (i).

Embodiment 12. The lamp of any one of the preceding embodiments, wherein the software program further comprising a step of: operating an indicator to fast blink, if step (ii) and/or step (iv) is prolongedly pressed until released.

Embodiment 13. The lamp of any one of the preceding embodiments, wherein the software program is configured to control the operation of the lamp in an intelligent mode by executing the following steps: (1) determining whether a current voltage at solar panel component is lower than a pre-defined low voltage; (2) if lower, determining whether a current time has reached a first predetermined period before a saved night start time; (3) if reached, (3.1) saving the current time as a current night start time and a current battery level as a current battery start level, (3.2) calculating an expected battery usage by one or more of the following parameters: the current battery start level; a saved battery end level; a saved battery usage; and/or a target battery end level; and (3.3) calculating an expected average LED lumen level by the following parameters: an expected night length calculated from the current night start time and a saved night end time; an expected efficiency; and/or the expected battery usage from (3.2); (4) providing power to LED component based on the expected average LED lumen level; (5) determining whether a current voltage at the solar panel component is higher than a pre-defined high voltage; (6) if higher, determining whether a current time has reached a second predetermined period before the saved night end time; (7) if reached, (7.1) saving the current time from (6) as a current night end time and a current battery level as a current battery end level, (7.2) estimating a new expected night length by calculating and filtering a current night length based on the current night start time and the current night end time, (7.3) estimating a new expected efficiency by calculating and filtering a current efficiency based on current battery usage calculated from current battery start level, current battery end level, and the current night length; and (8) turning off the LED component and proceeding with step (1).

Embodiment 14. The lamp of any one of the preceding embodiments, wherein step (4) further comprising steps of: (4.1) providing a first power to LED component at an enhanced LED lumen level, from night start time to midnight time; (4.2) providing a second power to LED component at a reduced LED lumen level, from midnight time to dawn time; and (4.3) providing the first power to LED component at an enhanced LED lumen level, from dawn time to sunrise time.

Embodiment 15. The lamp of any one of the preceding embodiments, wherein step (3) further comprising steps of: if not reached, (3.4) determining a sum of day length and night length on the same date, and determining whether the sum is more than a predetermined time; (3.5) if more than the predetermined time, rebooting the lamp and proceeding with step (1); otherwise, proceeding with step (4).

Embodiment 16. The lamp of any one of the preceding embodiments, wherein step (7) further comprising steps of: if not reached, (7.7) determining a sum of day length and night length on the same date, and determining whether the sum is for more than a predetermined time; (7.8) if more than the predetermined time, rebooting the lamp and proceeding with step (1); otherwise, proceeding with step (8).

Embodiment 17. A method of controlling operation of the intelligent solar powered lamp as claimed in any one of the preceding embodiments, comprising the steps of: (1) determining whether a current voltage at solar panel component is lower than a pre-defined low voltage; (2) if lower, determining whether a current time has reached a first predetermined period before a saved night start time; (3) if reached, (3.1) saving the current time as a current night start time and a current battery level as a current battery start level, (3.2) calculating an expected battery usage by one or more of the following parameters: the current battery start level; a saved battery end level; a saved battery usage; and/or a target battery end level; and (3.3) calculating an expected average LED lumen level by the following parameters: an expected night length calculated from the current night start time and a saved night end time; an expected efficiency; and/or the expected battery usage from (3.2); (4) providing power to LED component based on the expected average LED lumen level; (5) determining whether a current voltage at the solar panel component is higher than a pre-defined high voltage; (6) if higher, determining whether a current time has reached a second predetermined period before the saved night end time; (7) if reached, (7.1) saving the current time from (6) as a current night end time and a current battery level as a current battery end level, (7.2) estimating a new expected night length by calculating and filtering a current night length based on the current night start time and the current night end time, (7.3) estimating a new expected efficiency by calculating and filtering a current efficiency based on current battery usage calculated from current battery start level, current battery end level, and the current night length; and (8) turning off the LED component and proceeding with step (1).

Embodiment 18. The method of any one of the preceding embodiments, wherein step (4) further comprising steps of: (4.1) providing a first power to LED component at an enhanced LED lumen level, from night start time till midnight time; (4.2) providing a second power to LED component at a reduced LED lumen level, from midnight time to dawn time; and (4.3) providing the first power to LED component at an enhanced LED lumen level, from dawn time to sunrise time.

Embodiment 19. The method of any one of the preceding embodiments, wherein step (3) further comprising steps of: if not reached, (3.4) determining a sum of day length and night length on the same date, and determining whether the sum is more than a predetermined time; (3.5) if more than the predetermined time, rebooting the lamp and proceeding with step (1); otherwise, proceeding with step (4).

Embodiment 20. The method of any one of the preceding embodiments, wherein step (7) further comprising steps of: if not reached, (7.7) determining a sum of day length and night length on the same date, and determining whether the sum is for more than a predetermined time; (7.8) if more than the predetermined time, rebooting the lamp and proceeding with step (1); otherwise, proceeding with step (8).

EXAMPLES

Provided herein are examples that describe in more detail certain embodiments of the present disclosure. The examples provided herein are merely for illustrative purposes and are not meant to limit the scope of the invention in any way. All references given below and elsewhere in the present application are hereby included by reference.

Example 1

This invention relates to spotlights, and in particular intelligent high intensity solar powered spotlights.

In some embodiments, the intelligent high intensity solar powered spotlight is intended for home owners as well as professional landscapers, architects, Resorts, Hotels, etc.

In some embodiments, the provided intelligent high intensity solar powered spotlight exceeds performance of conventional corded spot light without the need for cumbersome cabling nor utility bills to be paid.

In some embodiments, the intelligent high intensity solar powered spotlight is compact sized, yet can emit a focused light beam of up to 600 lumens.

In some embodiments, the intelligent high intensity solar powered spotlight has an ergonomic robust construction that will simplify installation and increase productivity.

In some embodiments, the intelligent high intensity solar powered spotlight provides "machine learning AI" that will make it the highest performance and most user friendly solar powered light ever invented.

Basic Specifications

In some embodiments, basic specifications of an example intelligent high intensity solar powered spotlight are summarized as below:

| | |
|---|---|
| A High Power Solar panel | 5.5 V output voltage, 2.2 W Total Power on compact 150 × 95 mm area |
| High capacity Li-ion battery | 18650 type ×2 3.7 V 2600 mah |

-continued

| | |
|---|---|
| High efficiency LED | 5 W, wide operation voltage range from 6 V to 36 V |
| Professional Optical focus lens | 24 degree maximum angle for increased focus and longer range |
| Optional USBC Port | For additional charging method when needed |

Innovative Mechanical Aspects

1. Unlike certain gadget solar powered spotlight available in the market, using either a deported cabled panel OR a very unaesthetic "umbrella" panel attachment, in some embodiments, the provided intelligent high intensity solar powered spotlight is whole and compact in design.

2. In some embodiments, the provided intelligent high intensity solar powered spotlight comprises ETFE lamination to protect the solar cells from shocks and oxidation. The microprism pattern of the ETFE lamination also maximizes the solar capture from optical reflection as well as direct sunlight.

3. In some embodiments, the provided intelligent high intensity solar powered spotlight comprises waterproofed IP66 construction, including:
 a—Ultrasonically sealed UV protected acrylic front lens; and/or
 b—Gaskets: disposed between optical lens and flat front lens, between front cap and main housing, and/or around the battery compartment.

4. In some embodiments, the provided intelligent high intensity solar powered spotlight has an anti-overheating design through vent holes to maximize Li-ion battery operating performance. The vent holes can be disposed:
 a—On Front cap; and/or
 b—On the battery door to prevent temperature and pressure deformation.

In some embodiments, the vent holes are equipped with waterproof breathable fabric adhesives, allowing air to flow in and out while blocking water ingress, hence securing the waterproofed construction (IP66 rating) while maximizing operational efficiencies.

5. In some embodiments, the provided intelligent high intensity solar powered spotlight comprises anti-condensation water drains to prevent internal oxidation and/or water build up. The anti-condensation water drains can be disposed:
 a—On Front cap to prevent water build up in the lens cabinet; and/or
 b—At the rear of the spot to prevent water build up when spot is at an angle.

6. In some embodiments, the intelligent high intensity solar powered spotlight comprises an "Anti Drooping" Angle locking mechanism which includes the features below (referring to FIG. 1):
 a—Allows user to choose the beam angle with great flexibility;
 b—7 steps of 15 degrees each; and/or
 c—Once locked in place, the "Anti Drooping" angle locking mechanism will ensure the spotlight does not droop lower from accidental shocks or gravity over the time.

7. In some embodiments, the intelligent high intensity solar powered spotlight comprises an Ergonomic Multi terrain Anchoring base Design which includes the features below:
 a—Allows Front and back mounting nails vertical hammering without interfering/tampering or impacting the main housing (referring to FIGS. 2A-2B);
 b—3 Anchor "claws" for easier installation and stronger grip to the ground;
 c—Cut out areas around the entire rim to allow:
 c1—Optimum fitting onto uneven grounds;
 c2—Easy Tool insertion for extracting the spot base and relocating the light whenever needed (referring to FIG. 3).

8. In some embodiments, the intelligent high intensity solar powered spotlight comprises Universal Front cap railing groove to allow multiple attachments, which includes the features below:
 a—Mood enhancing light color filter attachment allowing user to change the lighting atmosphere to a multitude of various colors for various occasions with the same LED power source by simply sliding the appropriate color lens into the filter lens universal attachment (referring to FIGS. 4A-4C, 5A); and/or
 b—Rotating Shades to prevent blinding and to further direct and focus the light beam (referring to FIGS. 5B-5C).

Innovative Electronic Features

1. In some embodiments, the intelligent high intensity solar powered spotlight comprises a "Max Charge" system that will maximize the Solar panel energy collection, using MPPT (maximum Power Point Tracking), which no other consumer solar lighting device has used to date.

In some embodiments, the intelligent high intensity solar powered spotlight comprises a "step down convertor" that will optimize the alignment of the panel and battery voltage.

2. In some embodiments, the intelligent high intensity solar powered spotlight comprises a unique battery management circuitry to maximize charging capacity, to protect from overcharge and over discharge and to maximize battery life.

3. In some embodiments, the intelligent high intensity solar powered spotlight comprises a "Max Lumen" system that will maximize lumen output and direct maximum energy to the LED while minimizing energy loss from heat dissipation up to minimum 600 lumens.

In some embodiments, the intelligent high intensity solar powered spotlight comprises a proprietary "step up convertor" circuitry for use.

Innovative MCU Driven User Interface

4. In some embodiments, the intelligent high intensity solar powered spotlight comprises an INNOVATIVE Mode Selection—with "positive"/intuitive feedback, which includes the features below:
 a—Single switch controlled;
 b—1 short "click" sets Mode 1=Intelligent Mode (see below detailed explanation--->1 Flash feedback to indicate Mode 1;
 c—2 short "clicks" sets Mode 2=Auto on Mode and light intensity selection--->2 Flashes feedback to indicate Mode 2;
 d—3 short "clicks" sets Mode 3="Always on mode" and light intensity selection--->3 Flashes feedback to indicate Mode 3;
 e—When in Mode 1, a short click change to Mode 2; When in Mode 2 a short click changes to Mode 3;
Finally when in Mode 3, a short click switches the unit OFF.

5. In some embodiments, the intelligent high intensity solar powered spotlight comprises an Innovative Light Intensity Selection—with continuous dimmer.

Unlike some of the other solar powered lights available on the market, the intelligent high intensity solar powered spotlight is equipped with a linear continuous dimmer, allowing the user to select his preferred lighting output depending on his needs or occasions, by a single switch operation.

Maintaining the On-switch in Pressed position on Mode 2 or 3, the user can set the light output anywhere he chooses from 10 to 600 Lumens.

6. In some embodiments, the intelligent high intensity solar powered spotlight comprises a Digital Fuel gauge indicator, which is innovative and intuitive, which includes the features below:
- a—When the device is charging using the USB C port to an electrical socket:
  - a1—a quick blink will indicate battery charge<25%;
  - a2—two quick blinks will indicate battery charge between 25 and 75%;
  - a3—three quick blinks will indicate battery charge>75%.
- b—When the device is charging using the solar power: three quick blinks will indicate battery charge>75%.
- c—When in operation, lighting lumen output dropping to 10 indicates battery charge is <15%.

"Machine learning A.I." to optimize operations and to maximize performance and user experience—The "INTELLIGENT MODE"

In some embodiments, the provided intelligent high intensity solar powered spotlight comprises a "Machine learning A.I." (i.e., the INTELLIGENT MODE") to optimize operations and to maximize performance and user experience.

Main problem in available solar lights on the market is that lighting autonomy at night is directly depending on how much the battery could charge the previous day. This creates huge fluctuation in terms of lighting hours per night from day to day.

The provided "INTELLIGENT MODE" solves this problem totally by guaranteeing lighting ALL NIGHT LONG, as would be the case on a low voltage cabled outdoor light. Plus it will automatically lessen the Lumen output when one needs it less AND increase it when one needs it most.

1. In some embodiments, the provided "INTELLIGENT MODE" is based on sophisticated algorithms taking into consideration:
   - a—The current battery charge; AND
   - b—The average long term charging memory of the device.

In some embodiments, one or more light sensors, and controllers are operatively connected with the intelligent high intensity solar powered spotlight.

In some embodiments, the provided intelligent high intensity solar powered spotlight can determine on its own, by extrapolation, how much capacity it can afford to use up that night.

2. In some embodiments, the provided intelligent high intensity solar powered spotlight can also, based on its life-long average charging memory, determine when the sun will rise the following morning, hence will determine the next night duration.

Knowing the capacity available and the hours it needs to light up the following night, in some embodiments, the provided intelligent high intensity solar powered spotlight will set its own lumen output for that night duration at any given date.

3. In some embodiments, the provided intelligent high intensity solar powered spotlight is equipped with the available battery capacity and the upcoming night duration, it will set its own average Lumen output for the night (for example, 300 lumen).

4. Then, in some embodiments, the provided intelligent high intensity solar powered spotlight will automatically distribute the available power intensity based on a programmed formula to match when people need their light most. In one example, when the average lumen output is determined as 300 lumen, the programmed formula is summarized as follows:

| | |
|---|---|
| 4/3 From start to midnight | 400 lumen |
| 2/3 from midnight to 1 hour before sunrise | 200 lumen |
| 4/3 for the last hour before sunrise | 400 lumen |

5. In some embodiments, this is an outstanding feature that takes care of any setting and make the provided intelligent high intensity solar powered spotlight a Turn key, with zero need for manual management.

Example 2

Example 2.1: Solar Powered Lamp 100

Now referring to FIG. 1, an example intelligent high intensity solar powered spotlight (also referred to as "intelligent solar powered lamp, system or device") comprising an "Anti Drooping" angle locking mechanism is shown. In this embodiment, intelligent solar powered lamp 100 includes a base 110, a neck portion 120, and a housing 120. The neck portion 120 is connected with or extended from the base 110 at one end and installed with a plurality of interlocking teeth 140 at the opposing end. The housing 130 houses or provides support for the main components of the lamp and includes a groove dial 150, which further includes a plurality of grooves 151. The plurality of grooves 151 are sized and shaped to interact with the plurality of interlocking teeth 140, such that when the housing 130 is connected to the neck portion 120, each of the interlocking teeth 140 mates with one of the groove 151 to secure the position of the housing 130 relative to the base 110.

In some embodiments, there are six interlocking teeth 140 installed in the neck portion 120. The plurality of interlocking teeth 140 and grooves 151 of the groove dial 150 form an interlocking part which allows a user to adjust the beam angle with greater flexibility as well as locking the intelligent solar powered lamp 100 in place. Once locked in place, the "Anti Drooping" angle locking mechanism will ensure the spotlight does not droop lower from accidental shocks or gravity over the time. In some embodiments, the interlocking part allows a user to adjust the angle at 7 steps of 15 degrees each.

Figures 2A, 2B:
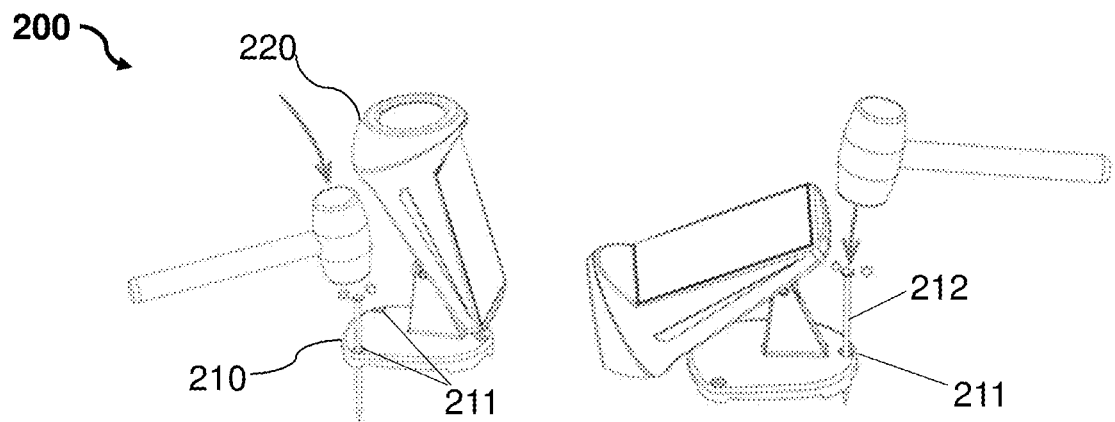
FIGS. 2A-2B illustrate the base design of an example the intelligent high intensity solar powered lamp according to an example embodiment.

Now referring to FIGS. 2A-2B, an example the intelligent high intensity solar powered lamp 200 having an ergonomic multi-terrain anchoring base design is shown. In this embodiment, the lamp 200 similarly includes a base 210, a neck portion (not clearly shown) and a housing 220. As shown in FIG. 2A, base 210 further includes a plurality of fastening receiving portions 211. In some embodiments, each fastening receiving portion 211 is configured to receive a fastening element 212 (such as a nail or a pin), as shown in FIG. 2B, which allows front or back mounting without interfering, tampering or impacting the main housing 220, thereby forming anchor "claws" and allowing stronger grip to a surface. In some embodiments, the fastening receiving portions 211 allow easy installation by receiving fastening element 212 such as nails that can be installed by vertical hammering, or screws.

Figure 3:
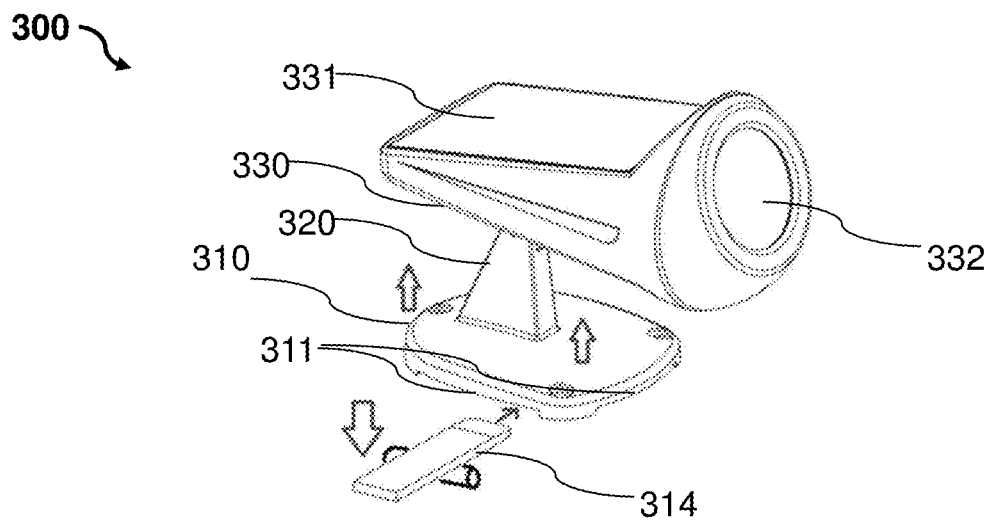
FIG. 3 illustrates the base design of an example the intelligent high intensity solar powered lamp according to another example embodiment.

Now referring to FIG. 3, another example intelligent solar powered lamp 300 is shown. In this embodiment, intelligent solar powered lamp 300 includes a base 310, a neck portion 320, and a housing 330. The base 310 further includes a plurality of cut out portions 311 around the rim, which allows for optimum fitting onto uneven grounds, as well as easy insertion of a tool 314 for extracting the base 310 and relocating the intelligent solar powered lamp 300 whenever needed. In this implementation, the base 310 is generally in rounded rectangular shape and includes four cut portions 311 at the bottom side of the base, leaving the four corners to create four "feet" for support. The four feet allows stability on uneven ground and allow for a tool 314 to go under for easier removal. In some examples, the solar panel component 331 is positioned on the upper side of the lamp, and the LED component 332 is positioned of the front side of the lamp. The rest of the components such as microcontroller, converter, battery component are housed within the housing 330.

Now referring to FIGS. 4A-4C, front cap replacement mechanism of another example intelligent solar powered lamp is shown. FIG. 4A shows a front cap portion 400 of an example intelligent solar powered lamp. Front cap portion 400 includes a front cap opening 410, and a railing groove 420 positioned about the front cap opening 410. Railing groove 420 forms a recess which can receive a filter mount with a matching size. As shown in FIG. 4B, front cap opening 410 is configured to receive a filter mount 430 by engaging and retaining the filter mount 430 within the railing groove 420. Now referring to FIG. 4C, filter mount 430 further includes a slot 431 to receive at least one filter 432. In some embodiments, filter 432 is a mood enhancing light color filter lens. The filter mount 430 allows a user to change the lighting atmosphere to a multitude of various colors for various occasions with the same LED power source by simply sliding the appropriate color lens into the slot 432. In some embodiments, the shades of the filter 432 can be rotated to prevent blinding.

Now referring to FIGS. 5A-5C, another example intelligent solar powered lamp 1000 with filter mounts is shown. In this embodiment, intelligent solar powered lamp 1000 is attached with a filter mount 1430. Filter mount 1430 includes a slot 1431 to receive at least one filter, such as filter 1432 or filter 1433, as shown in FIG. 5A. In some embodiments, the filter mount 1430 is designed with a circular shape. In some embodiments, filter mount 1440 is designed with raised edges on two opposing sides, as shown FIG. 5B. In other embodiments, filter mount 1450 is designed with raised edges on one side, as shown FIG. 5C. In some embodiments, the filter mounts 1440 and 1450 can be rotated, allowing a user to re-direct, adjust and/or focus the light beam.

Example 2.2: Solar Powered Lamp 2000

Figure 6:
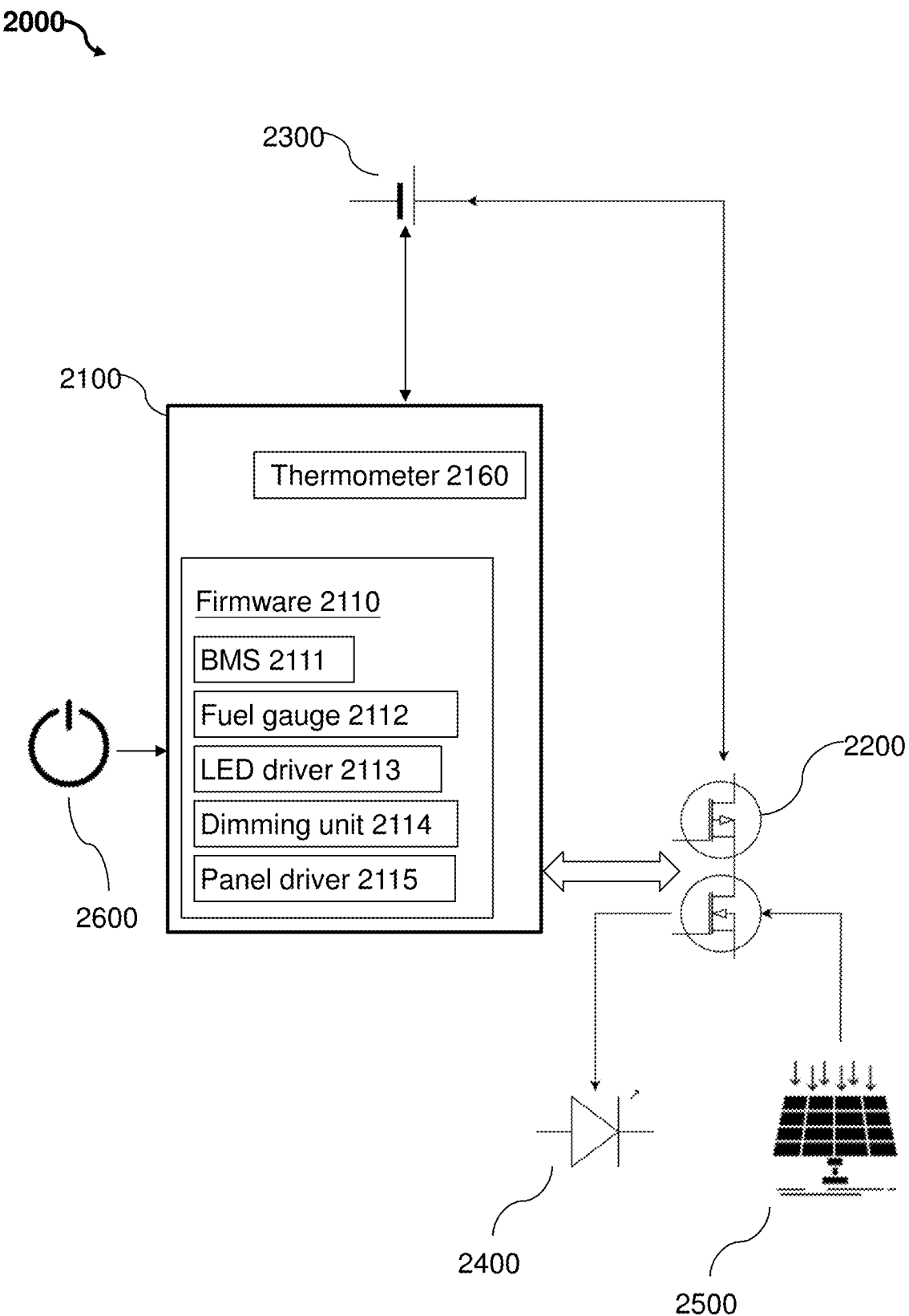
FIG. 6 is a diagram illustrating a solar powered lamp in accordance with an example embodiment.

Referring now to FIG. 6, which shows an example embodiment of a solar powered lamp 2000. In this example, the solar powered lamp 2000 is a lighting system that generally includes a microcontroller unit (MCU) 2100, a converter 2200, a battery 2300, a light emitting diode (LED) 2400, a solar panel 2500 and a power button 2600, operatively connects with each other.

In this embodiment, the MCU 2100 operatively connects with the battery 2300 and the MCU 2100 is in electrical communication with the converter 2200. The MCU 2100 further includes a built-in thermometer 2160. The MCU 2100 contains a processor and a memory (not shown) that stores a firmware 2110 (also referred to as "software program" in some embodiments). The MCU 2100 contains operating module configured to control the other components of the solar powered lamp based on a variety of preset programs stored in the firmware 2110. In this embodiment, the firmware 2110 includes a battery management system (BMS) 2111, a fuel gauge 2112, a LED driver 2113, a dimming unit 2114, a solar panel driver 2115. In some embodiments, by utilizing these preset or built-in programs in the firmware 2110, the MCU 2100 is able to centralize at least the functions of battery management, LED driving and solar panel charging in one single component. In some embodiments, the MCU 2100 is in charge of fuel gauge, battery safety, driving the converter, managing ergonomics (in response to pressing of power button 2600 such as for tampering mode, which will be described in more detail later) and managing preset usage modes and intelligent mode of the solar powered lamp 2000. The battery management system 2111 is configured to control the charging and the discharging of the rechargeable battery 2300 to maximize charging capacity, to keep the battery 2300 within the safety operation region in terms of voltage, current, and temperature during the charging and the discharging process so as to protect the battery 2300 from overcharge and over discharge and to maximize battery life. In this embodiment, the battery management system 2111 operatively connects and works with the thermometer 2160 that serves as a temperature sensor for the battery 2300. In some embodiments, the battery 2300 is a Li-ion cell, and the thermometer 2160 is positioned underneath the Li-ion battery cell to continuously monitor the temperature of the battery cell. This temperature monitoring feature allows for greater security against overheating of the battery 2300 and potential accidental fire and will allow for battery life span extension and maximization. For example, if the temperature is sensed at a high temperature (such as >50° C.), the MCU 2100 will order a "Cool Off" signal to the BMS 2111 by progressively reducing the maximum charging level of the battery 2300. If the temperature is sensed at an even higher temperature (such as >70° C.), the MCU 2100 will order a "Total shutdown" signal to the BMS 2111 to stop the battery charging and discharging the battery.

The fuel gauge 2112 is configured to measure the battery voltage and current of the battery 2300, allowing accurate indications of the battery State of Charge (SoC). Details of the fuel gauge 2112 and its operation will be discussed later.

The LED driver 2113 and the solar panel driver 2114 are configured to drive the LED 2400 and the solar panel 2500, respectively, under control of the MCU 2100.

The dimming unit 2114 is configured to control the lighting lumen output of the LED 2400. In some embodiments, the dimming unit 2114 is a linear continuous dimmer, allowing the user to select his preferred lighting output depending on his needs or occasions, by a single switch operation of the power button 2600. For example, by maintaining the power button 2600 in different pressing states on different pre-set usage modes, the user can set the light output anywhere such as when he chooses from 10 to 600 Lumens.

The power button 2600 is configured to switch on/off the solar powered lamp 2000 by user touch(es). In some embodiments, the power button 2600 is also configured to switch between different preset usage modes (also referred to as "personalized mode or manual mode" in some embodiments) or intelligent mode when pressed by the user for a pre-determined period of time. For example, the power button 2600 can be programmed to trigger the following intelligent mode or pre-set usage modes when pressed by the user:

(a) 1 short press sets the system to "Intelligent Mode" (also referred to as "Smart Mode" in some embodiments, and will be discussed in detailed later), and the LED 2400 (or another indicator) produces 1 flash feedback to indicate entering the Intelligent Mode;

(b) 2 short presses set the system to "Auto on Mode" and allows for light intensity selection, and the LED 2400 (or another indicator) produces 2 flashes feedback to indicate entering the Auto on Mode;

(c) 3 short presses set the system to "Always on Mode" and allows for light intensity selection, and the LED 2400 (or another indicator) produces 3 flashes feedback to indicate entering the Always on Mode;

(d) When in the "Intelligent Mode", a short press changes the system to "Auto on Mode"; When in the "Auto on Mode", a short press changes to the system to "Always on Mode";

(e) When in the "Always on Mode", a short press switches the system OFF.

In this embodiment, the converter 2200 electrically connects with the battery 2300, the LED 2400 and the solar panel 2500 respectively to allow the selection of power paths between these units. In some embodiments, the converter 2200 is a metal-oxide-semiconductor field-effect transistor (MOSFET) half-bridge based converter. In some embodiments, the converter 2200 is configured to receive signals from the MCU 2100 to control and regulate the power flow between the battery 2300, the LED 2400 and the solar panel 2500. Details of the converter and its operation will be discussed later.

Example 2.3: Solar Powered Lamp 3000

Figure 7:
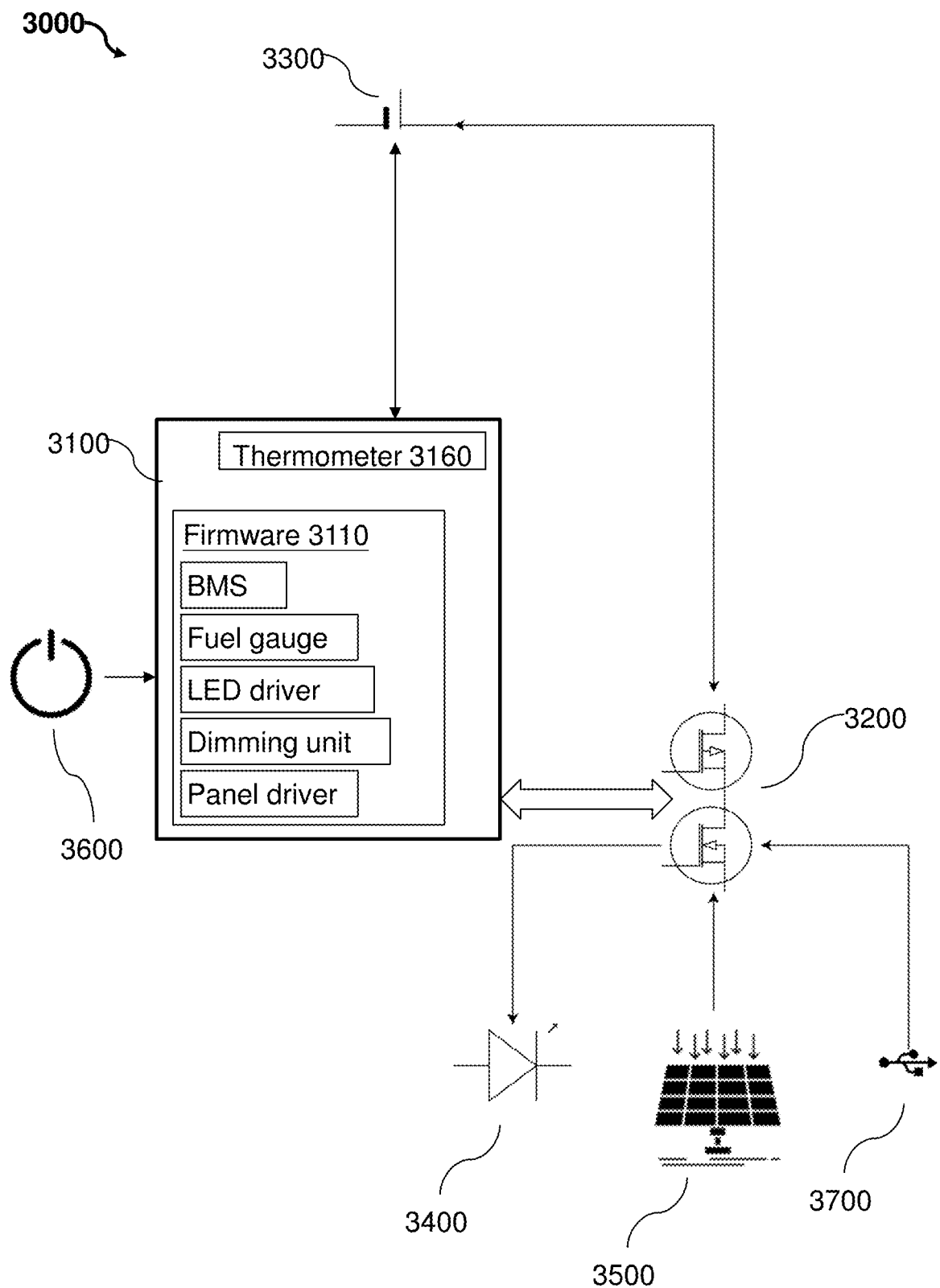
FIG. 7 is a diagram illustrating a solar powered lamp in accordance with another example embodiment.

Referring now to FIG. 7, which shows another example embodiment of a solar powered lamp 3000. Similar to the example embodiment as described in Example 2.2, the solar powered lamp 3000 includes a microcontroller unit (MCU) 3100, a converter 3200, a battery 3300, a light emitting diode (LED) 3400, a solar panel 3500 and a power button 3600, operatively connected with each other. In this example embodiment, the solar powered lamp 3000 further includes a USB interfacing module 3700. In some embodiments, the USB interfacing module 3700 includes or connects with a USB charger as an additional charging method for the battery 3300 (for example, by connecting the USB charger with an external power source), and/or drawing power from the battery 3300 to charge any external devices when needed.

In this embodiment, the converter 3200 electrically connects with the battery 3300, and further electrically connects with the LED 3400, the solar panel 3500 and the USB interfacing module 3700, respectively, to allow the switch and selection of power paths between at least these units. In some embodiments, the converter 3200 is a metal-oxide-semiconductor field-effect transistor (MOSFET) half-bridge based converter. In some embodiments, the converter 3200 is configured to receive signals from the MCU 3100 to control and regulate the power flow between the battery 3300, the LED 3400, the solar panel 3500, and the USB interfacing module 3700. As such, only one single, integral converter is required to provide power from polar panel or USB interfacing module to the LED 3400, to recharge the battery 3300 with the solar panel 3500 or USB charger. In one example, the type of USB interface used is USBC.

In this example embodiment, the MCU 3100 operatively connects with the battery 3300 and is in electrical communication with the converter 3200. Similar to MCU 2100 in example 2, the MCU 3100 includes firmware 3110 and a thermometer 3160. The MCU 3100 is configured to control the components of the solar powered lamp 3000 based on a variety of preset programs stored in the firmware 3110. The components of firmware 3110 are similar to or the same as firmware 2110 as described in preceding examples. For the sake of clarity, the discussions of components of firmware 3110 and the function of MCU 3100 are not repeated herein.

Example 2.4: Fuel Gauge Indicator System 4000

In some embodiments, the firmware of MCU of the solar powered lamp further includes a fuel gauge or fuel gauge software. In some embodiments, the fuel gauge is part of or contains a software program that provides the user battery charge status when charging by the solar panel, hence eliminating the need of relying on a separate dedicated IC to show battery status. The fuel gauge works with certain components or systems of the lamp to form a fuel gauge indicator system.

Figure 8:
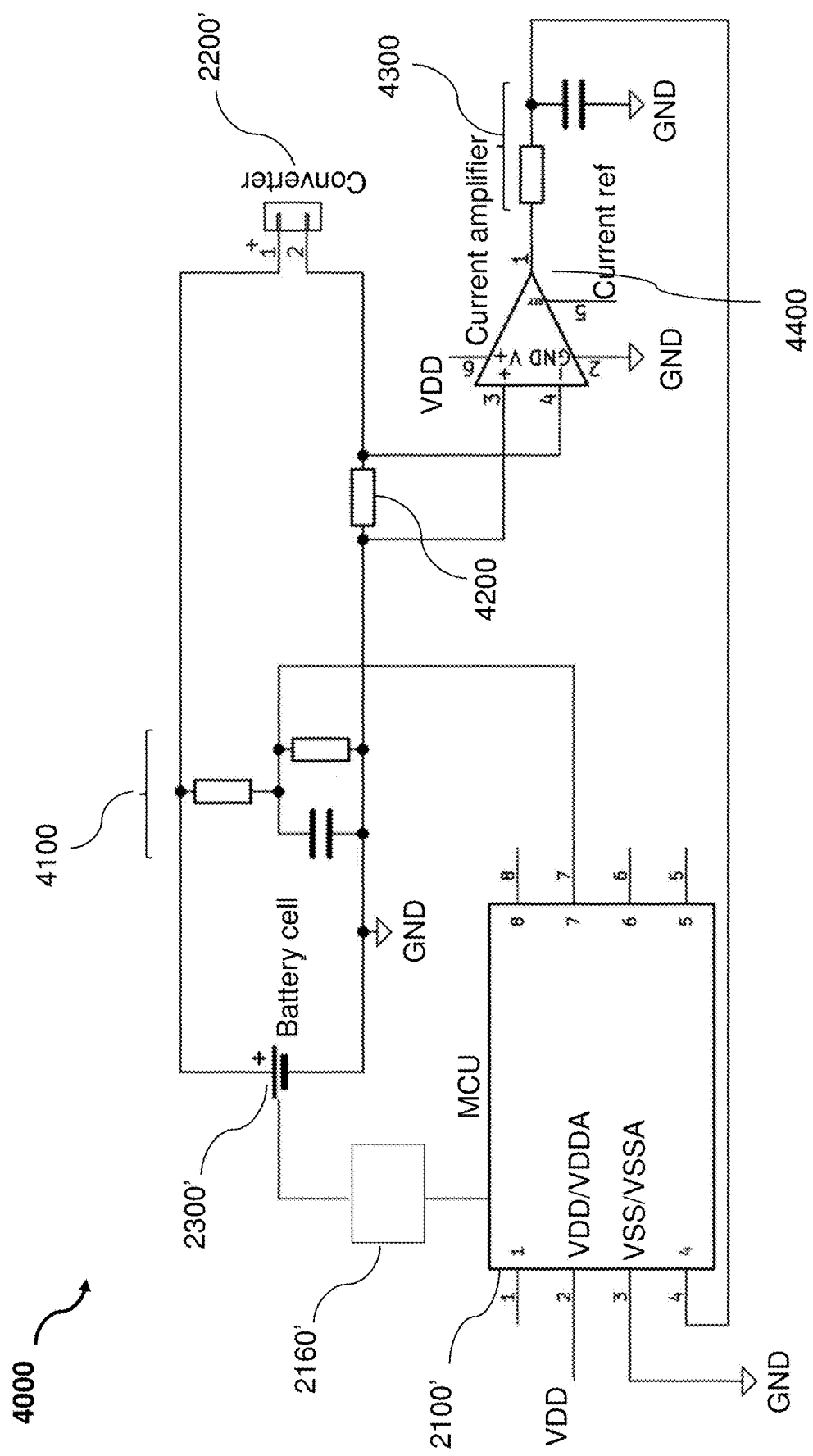
FIG. 8 is a circuit diagram of a fuel gauge indicator system in accordance with another example embodiment.

Referring now to FIG. 8, which shows a schematic circuit diagram showing how a fuel gauge indicator system 4000 of the solar powered lamp according to an example embodiment.

In this embodiment, the fuel gauge indicator system 4000 includes certain components which are part of the solar powered lamp similar to those as described in the other examples, including a MCU 2100', a converter 2200', a battery 2300', and a thermometer 2160', and further includes a filter voltage divider 4100, a shunt resistor 4200, a low pass filter 4300 and a current amplifier 4400. The fuel gauge is embedded in the MCU 2100' as part of the firmware. These components are in electrical connection with each other. In this embodiment, battery 2300' provides power to the entire system, and thermometer 2160' is integrated to MCU 2100' and is configured to measure the battery temperature. The converter 2200' is configured to select the power paths such that the system can power the LED (not shown) and draw power from solar panel (not shown) or USB module (not shown) to charge the battery 2300'. The filtered voltage divider 4100 is operatively connected to the converter 2200', the battery 2300' and the shunt resistor 4200, and its output is wired to an Analog to Digital Converter (ADC) pin of the MCU 2100'.

The shunt resistor 4200 is configured to measure the battery current of the battery and send signals to the system. In this embodiment, the shunt resistor 4200 electrically connects with the battery 2300', the converter 2200', the filter voltage divider 4100 and the current amplifier 4400. In some embodiments, the shunt resistor 4200 is a low ohmic value resistor to reduce losses, and its signal will be amplified by the current amplifier 4400. The current amplifier 4400 further electrically connects with the low pass filter 4300, which in turn electrically connects with an ADS pin of the MCU 2100', such that the amplified and filtered signal can be fed to the MCU 2100' to calculate the battery state of charge of the battery 2300'.

The battery state of charge (SoC) is calculated from measured voltage by the fuel gauge system 4000. In some embodiments, the fuel gauge indicator system is configured to perform a precise SoC measurement and/or a less precise SoC measurement. For example, precise SoC measurement are performed at day/night and night/day transitions where battery current is very close to 0 for a long time. These precise measurements can be used, for example, in the "Intelligent Mode". In some embodiments, less precise SoC measurement are also performed during usage by using measured battery voltage corrected with measured battery current and expected battery internal resistance. This less precise measurement can be used, for example, for SoC indications during charge, empty battery turn off and near empty battery light output reduction.

In some embodiments, the fuel gauge indicator system is a digital fuel gauge indicator or algorithm as a part of the firmware that works with other physical components in the lamp. In some embodiments, the fuel gauge indicator system can work with the LED component (or other indicator) to perform one or more of the following:
- (a) When the battery is charging using a USB port connected to an external power source:
- a1—a quick blink from the LED (or another indicator) indicates the current battery charge is low, such as <25%;
- a2—two quick blinks from the LED (or another indicator) indicate the current battery charge is medium, such as between 25 and 75%;
- a3—three quick blinks from the LED (or another indicator) indicate the current battery charge is high, such as >75%.
- (b) When the battery is charging using the solar power panel:
- b1—three quick blinks from the LED (or another indicator) indicate battery charge is high, such as >75%.
- (c) When the solar powered lamp is in operation, LED lighting lumen output dropping to 10 indicates battery charge is very low, such as <15%.

Example 2.5: Converter 5000

Figure 9:
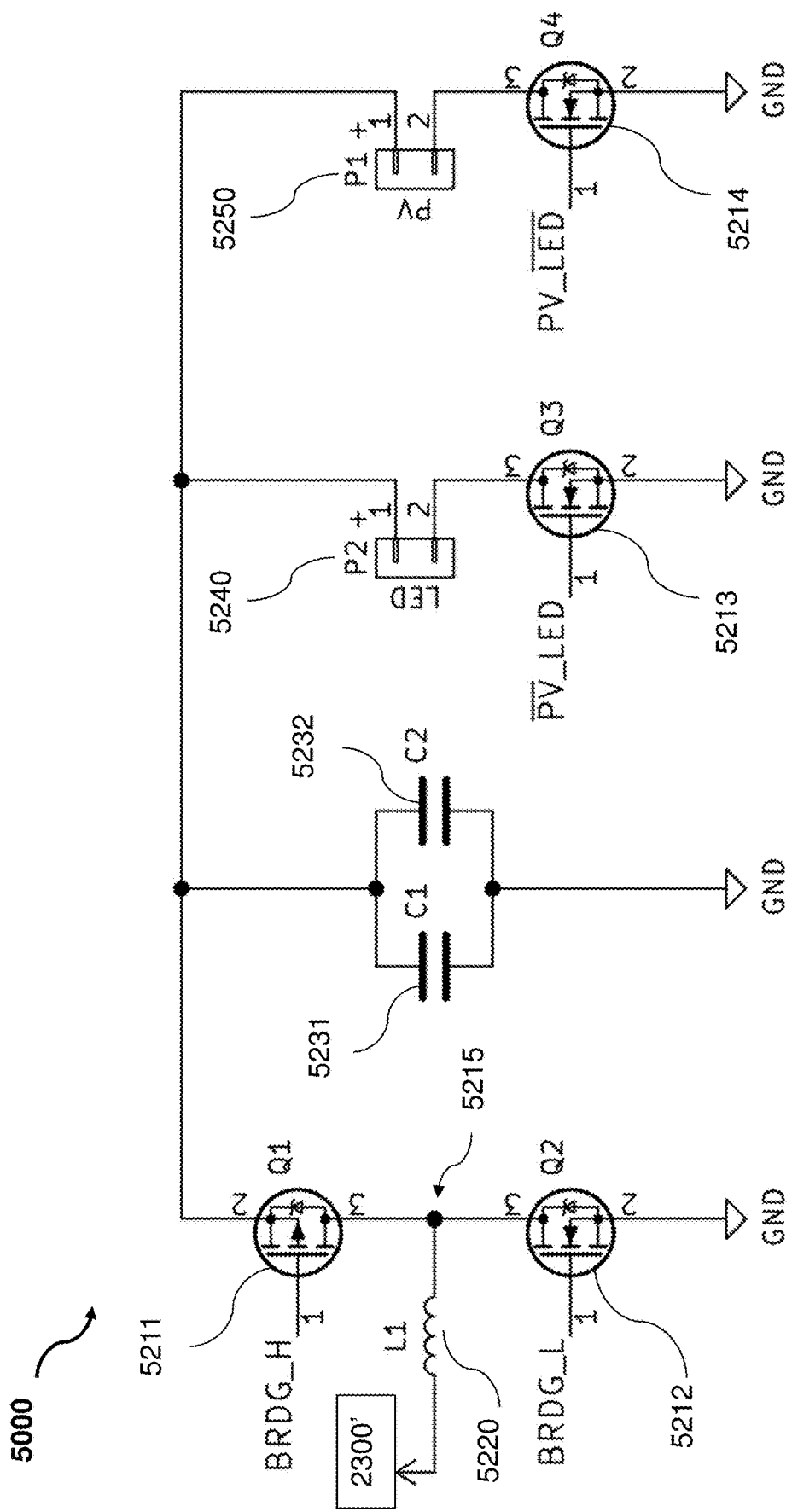
FIG. 9 is a circuit diagram of a converter in accordance with an example embodiment.

Referring now to FIG. 9, which shows a schematic circuit diagram of a converter 5000 of a solar powered lighting system or lamp according to an example embodiment. In this embodiment, the converter 5000 is a bidirectional or multi-directional switching converter. The converter 5000 includes a first switching unit 5211, a second switching unit 5212, a third switching unit 5213, a fourth switching unit 5214, an inductor 5220, a first capacitor 5231 and a second capacitor 5232. The inductor 5220 operatively (electrically) connects with a battery 2300' of the system. In some embodiments, the first switching unit 5211, the second switching unit 5212, the third switching unit 5213 and/or the fourth switching unit 5214 are MOSFETs and allows for selection of power path(s). The first switching unit 5211 and the second switching unit 5212 are connected in series at a node 5215. The inductor 5220 connects with the node 5215 at one terminal and with a battery 2300' of a solar powered lighting system at another terminal. The third switching unit 5213 is connected to the LED connecting portion 5240 in series. The fourth switching unit 5214 is connected to a solar panel connecting portion 5250 in series. The LED connecting portion 5240, the solar panel connecting portion 5250, the capacitors 5231 and 5232, and the first switching unit 5211 are connected in parallel. The LED connecting portion 5240 operatively connects to a LED (not shown), and the solar panel connecting portion 5250 operatively connects to a solar panel (not shown).

By this configuration, the converter 5000 allows the switching of the power path such that power flows from solar panel (via the solar panel connecting portion 5250) to battery 2300' during the day (when sunlight is available) to charge the battery, and flows from the battery 2300' to the LED (via the LED connecting portion 5240) during the night to provide illumination.

Example 2.6: Converter 6000

Figure 10:
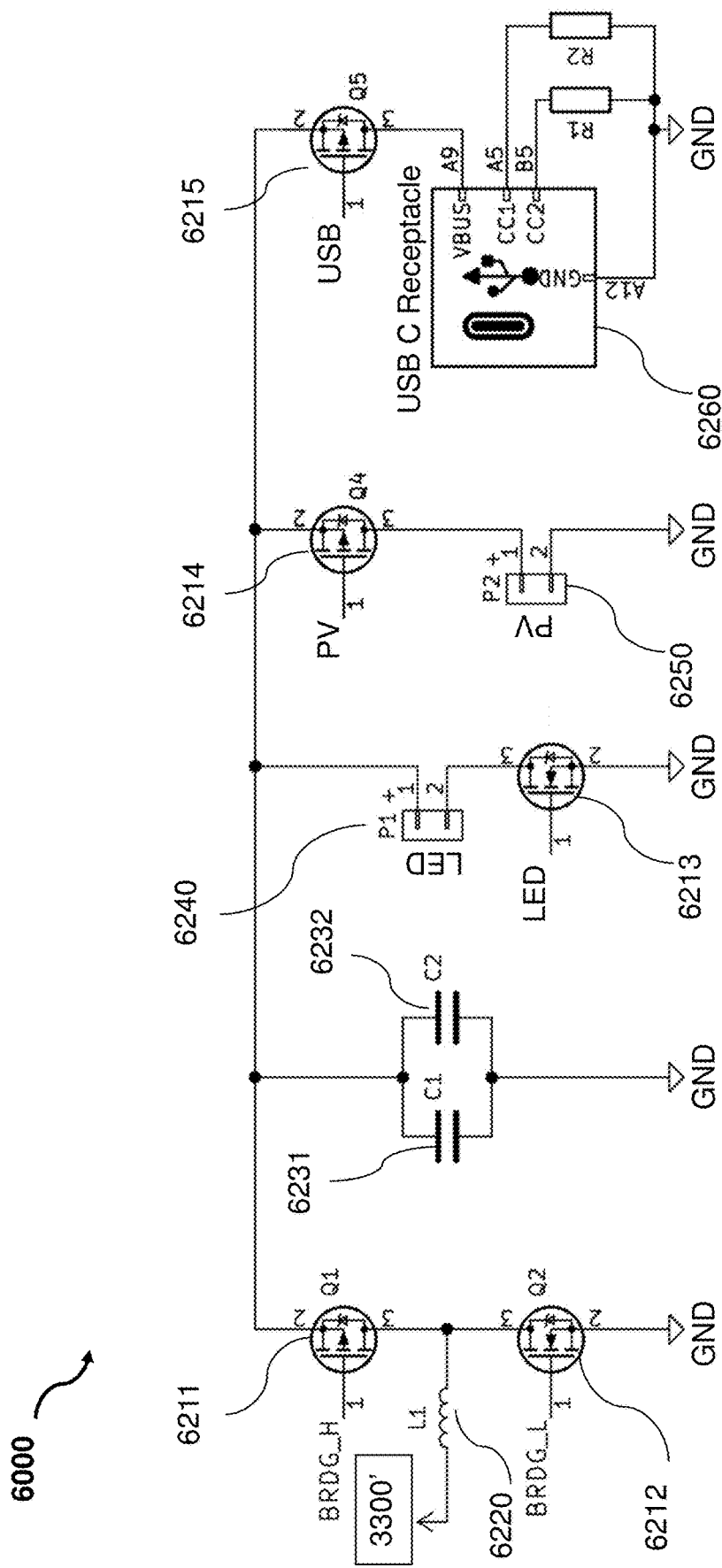
FIG. 10 is a circuit diagram of a converter in accordance with another example embodiment.

Referring now to FIG. 10, which shows a circuit diagram of a converter 6000 according to an example embodiment. In this embodiment, the converter 6000 is a bidirectional or multi-directional switching converter. Similar to the converter 5000 in preceding examples, the converter 6000 includes a first switching unit 6211, a second switching unit 6212, a third switching unit 6213, a fourth switching unit 6214, an inductor 6220, a first capacitor 6231, a second capacitor 6232, LED connecting portion 6240 and a solar panel connecting portion 6250. The connection of the aforesaid components of converter 6000 is similar or the same as converter 5000 as described above. In this embodiment, the converter 6000 further includes a fifth switching unit 6215 and a USB receptacle 6260. The fifth switching unit 6215 and the USB receptacle 6260 are connected in series. The USB receptacle 6260 connects to the first switching unit 5211, the capacitors 6231 and 6232, the LED connecting portion 6240, and the fourth switching unit 6214 in parallel.

By this configuration, the converter 6000 allows the switching of the power path such that power flows from solar panel (via the solar panel connecting portion 6250) or the USB receptacle 6260 to battery 3300', or flows from the battery 3300' to the LED (via the LED connecting portion 6240). As such, only a single converter is needed to switch on the LED, to recharge the battery with solar panel, or to recharge the battery with a USB charger.

Example 2.7: MPPT 7000

In some embodiments, the firmware of the MCU of the solar powered lamp further comprises a MPPT (Maximum Power Point Tracking) software program that maximizes the solar panel energy collection by the solar panel. In some embodiments, using the MPPT program, the solar panel working voltage is first decreased and subsequently increased when sun light is present to find voltage with maximum power from the solar panel.

Figure 11:
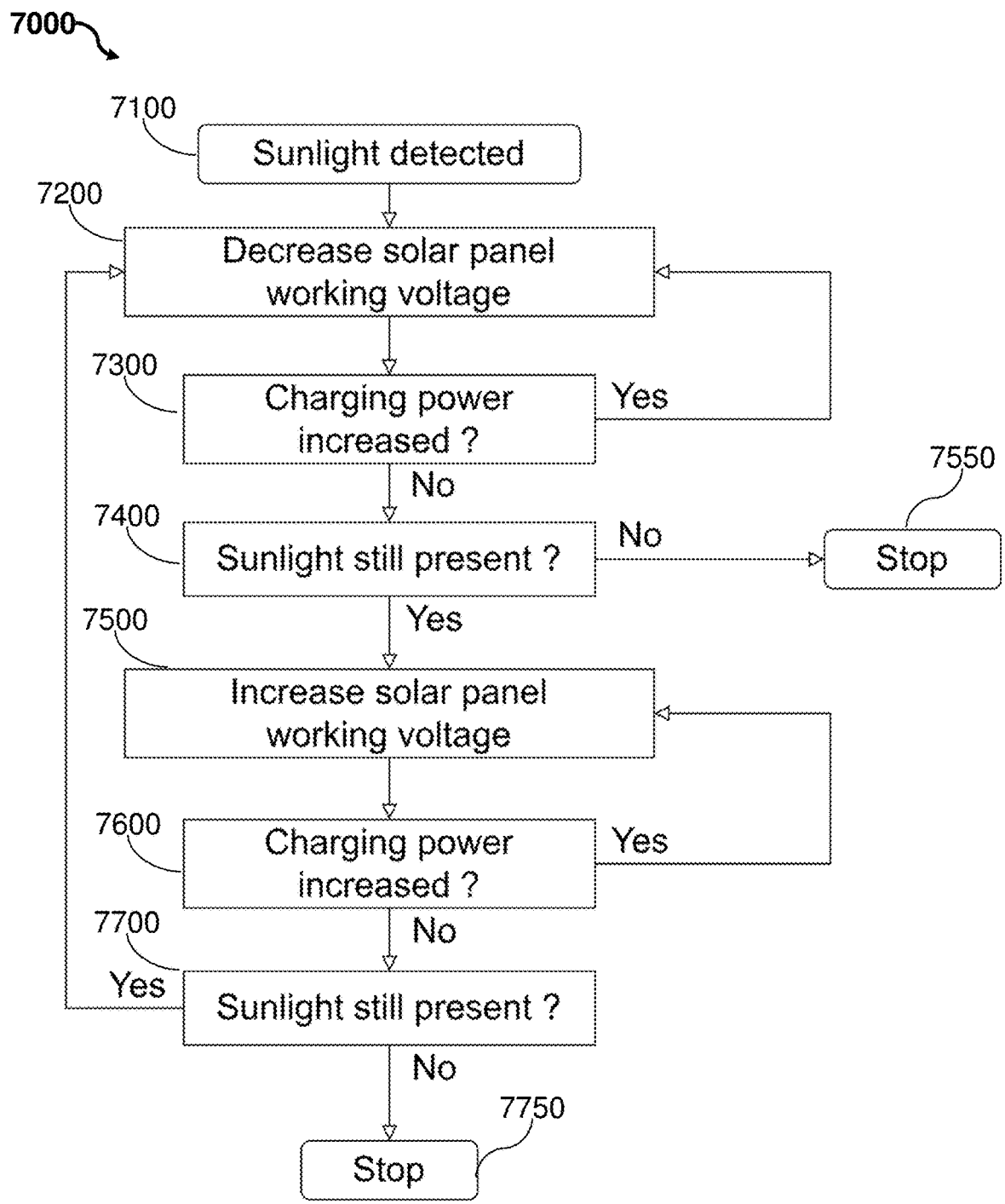
FIG. 11 is a flow chart demonstrating the battery charging program according to an example embodiment.

FIG. 11 shows an example flowchart of the steps executed in the MPPT (maximum Power Point Tracking) program 7000 according to an example embodiment. In this embodiment, the MPPT program 7000 executes the following steps:
- (a) step 7100: determining whether sunlight is detected by the solar panel;
- (b) step 7200: if detected, decreasing working voltage of the solar panel component;
- (c) step 7300: determining whether charging power of the battery component is increased; if increased, proceeding with step 7200; otherwise, proceeding with step 7400;
- (d) step 7400: determining whether sunlight is still detected by the solar panel;
- (e) step 7500: if detected, increasing the working voltage; otherwise, proceed with step 7550, i.e. stop charging the battery;
- (f) step 7600: determining whether the charging power is increased; if increased, proceeding with step 7500, otherwise, proceeding with step 7700;
- (g) step 7700: determining if sunlight is still detected; and if detected, proceeding with step 7200; otherwise, proceed with step 7750, i.e., stop charging the battery.

In solar panel mode, a working voltage is generated by the solar panel. At rest, this voltage can be called "open voltage". In some embodiments, a converter as described in preceding examples is responsible for setting its level in the range from 0V to an open voltage.

In some embodiments, the change in working voltage is measured such as every 1 millisecond (ms). If the working voltage measured is lower than a pre-defined low voltage such as for 15 ms, the system will determine that sunlight is no longer present.

In some embodiments, the system measures the battery voltage and current. Multiplication of these values gives the battery charging power, which is calculated such as every millisecond. In some embodiments, after each power calculation, working voltage is adjusted by 1 PWM (Pulse Width Modulation) step over a series of steps. In some embodiments, step polarity is switched when power decreases by 2% from peak to filter out spurious readings.

Example 2.8: Anti-Tamper Mode 8000

In some embodiments, the firmware of the MCU of the solar powered lamp further comprises an anti-tamper mode or program to allow the system to stay in a chosen mode and to prevent inadvertent tampering with the light system settings by any individuals. A user will therefore not need to reset the lighting system or lamp settings in case they would have been tampered with. In some embodiments, the firmware is configured to allow the lamp to be switchable between an intelligent mode that optimizing LED lumen level in response to at least battery usage, a preset usage mode that allows a user to manually control the operation or to customize the parameters of the lamp, and additionally an anti-tamper mode that prevents a user to change current setting (e.g., preset usage mode or intelligent mode) of the lamp. In one implementation, the anti-tamper mode is an "intelligent with anti-tamper mode" that prevents a user to change current setting of the intelligent mode of the lamp.

Figure 12:
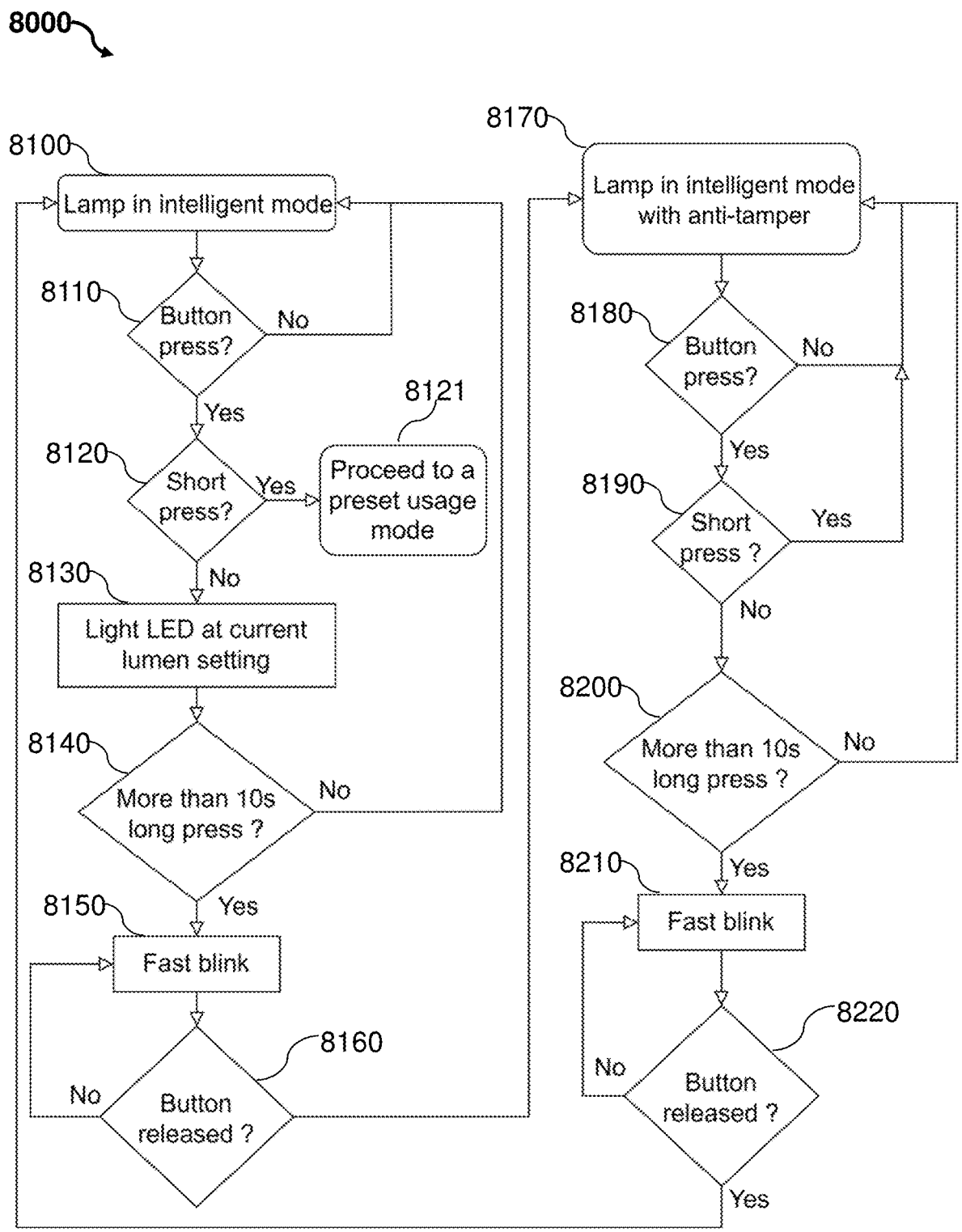
FIG. 12 is a flow chart demonstrating the anti-tamper program according to an example embodiment.

FIG. 12 shows a flowchart of the steps executed in the anti-tamper program 8000 according to an example embodiment. In this embodiment, the anti-tamper program 8000 executes the following steps:

(a) step 8100: proceeding with the intelligent mode and determining whether the button is pressed;

(b) step 8110: if pressed, determining whether the press is a pre-defined short press; In some embodiments, a pre-defined short press is a press that is less than or equal to a pre-defined time, for example, 10 seconds. In some embodiments, the pre-defined time is 1, 2, 3, 4, 5, 6, 7, 8, 9, 10, 11, 12, 13, 14, or 15 seconds or more.

(c) step 8120: if the press is a short press, proceeding with a preset usage mode (step 8121) that allows a user to manually control the operation or to customize the parameters of the lamp; otherwise, switching on the LED component using current lumen parameters (step 8130) and proceeding with step 8140; In some embodiments, the preset usage mode allows for light intensity selection. In embodiments, the preset usage mode is an "Auto on Mode" or an "Always on mode" as described in earlier embodiments.

(d) step 8140: determining whether the press is a pre-defined long press; In some embodiments, a pre-defined long press is a press that is more than a pre-defined time, for example, 10 seconds.

(e) step 8150: if the press is a long press, operating an indicator to blink fast; otherwise, proceeding with step 8100.

(f) step 8160: determining whether the button is released; if released, proceeding with step 8170; otherwise, operating the indicator to blink fast.

(g) step 8170: proceeding with an anti-tamper mode that does not allow the user to manually control the operation of the lamp and proceeding with step 8180;

(h) step 8180: determining whether the button is pressed;

(i) step 8190: if pressed, determining whether the press is a predefined short press (for example, less than or equal to 10 seconds); if the press is a short press, proceeding with step 8170; otherwise, proceeding with step 8200;

(j) step 8200: determining whether the press is a long press (for example, more than 10 seconds);

(k) step 8210: if the press is a long press, operates an indicator to blink fast; otherwise, proceeding with step 8170; and (l) step 8220: determining whether the button is released; if released, proceeding with step 8100; otherwise, operating the indicator to blink fast.

As such, the lamp can be switchable between the intelligent mode, the preset usage mode (personalized mode or manual mode), and the anti-tamper mode. In one implementation, the lamp is switchable between (1) the intelligent mode (with or without anti-tampering); (2) the personalized mode; (3) the manual mode; and (4) off mode (i.e., switch off the lamp).

Example 2.9: Intelligent Mode 9000

In some embodiments, the firmware of the MCU is configured to control the operation of the solar powered lamp in an intelligent mode that optimizes the lamp operations and maximizes performance and user experience. In some embodiments, the intelligent mode ensures that the LED lighting will sustain for the duration of the night, and will automatically reduce the LED lumen output when a user is expected to need it less and increase the LED lumen output when the user needs it most.

Figure 13:
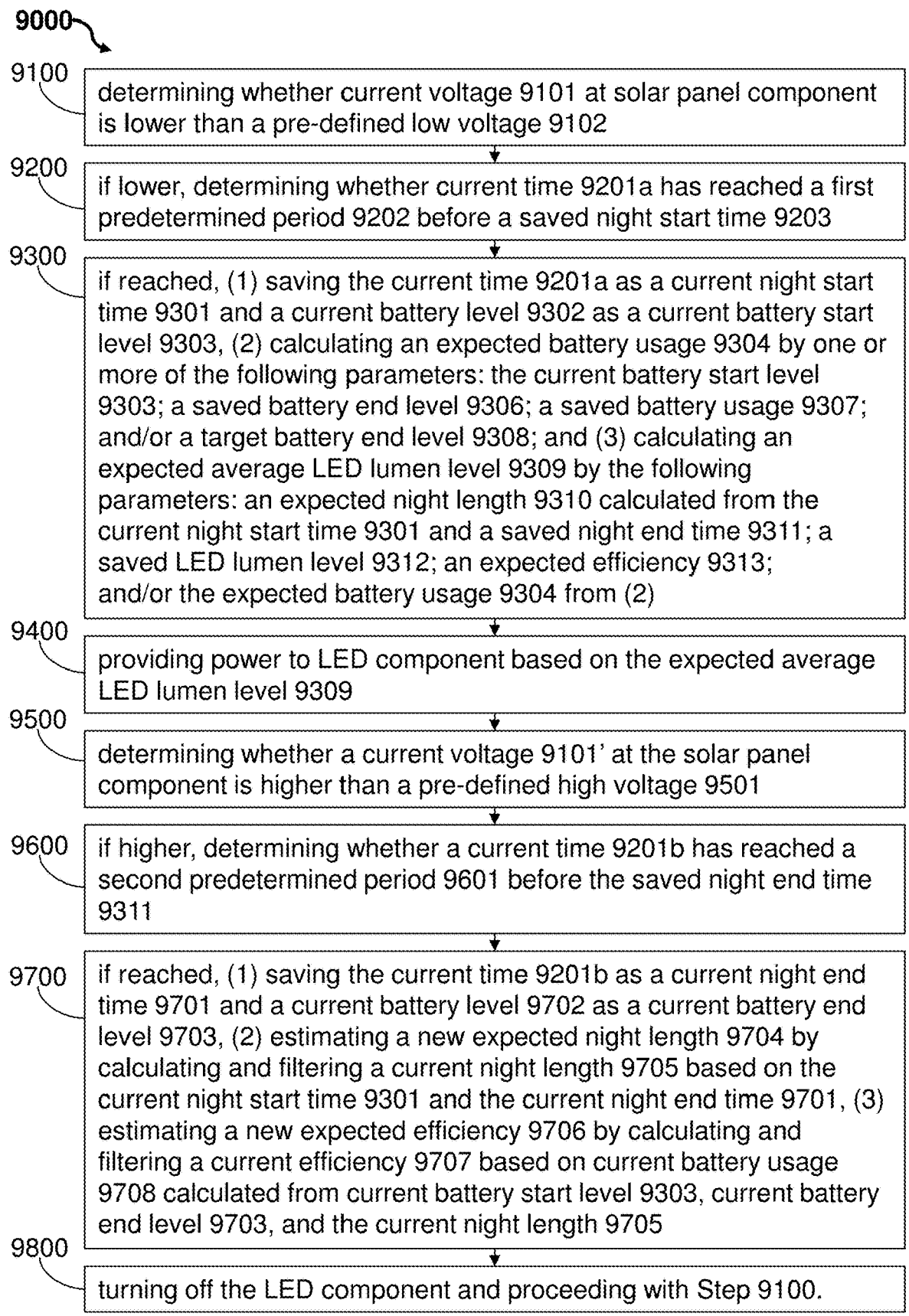
FIG. 13 is a flow chart demonstrating the intelligent mode 9000 according to an example embodiment.

Now referring to FIG. 13, a flow chart 9000 illustrating the steps executed during the intelligent mode is shown, according to an example embodiment where the following steps are executed.

In step 9100, the software determines whether a current voltage 9101 at solar panel component is lower than a pre-defined low voltage 9102.

In step 9200, if the current voltage 9101 is lower, the software then determines whether a current time 9201*a* has reached a first predetermined period 9202 before a saved night start time 9203.

In step 9300, if current time 9201*a* has reached the first predetermined period 9202, the software performs the following: (1) saving the current time 9201*a* as a current night start time 9301 and a current battery level 9302 as a current battery start level 9303, (2) calculating an expected battery usage 9304 by one or more of the following parameters:

a. the current battery start level 9303;

b. a saved battery end level 9306 (which is the battery end level of last night);

c. a saved battery usage 9307 (which is the battery usage of last night); and/or d. a target battery end level 9308; and (3) calculating an expected average LED lumen level 9309 by the following parameters:

a. an expected night length 9310. This may be a saved value from previous night or calculated from the current night start time 9301 and a saved night end time 9311;

b. an expected efficiency 9313; and/or c. the expected battery usage 9304 from (2).

In step 9400, the software provides power to LED component based on the expected average LED lumen level 9309.

In step 9500, the software determines whether a current voltage 9101' at the solar panel component is higher than a pre-defined high voltage 9501.

In step 9600, if higher, the software proceeds to determine whether a current time 9201b has reached a second predetermined period 9601 before the saved night end time 9311.

In step 9700, if the current time 9201b has reached a second predetermined period 9601, the software performs the following: (1) saving the current time 9201b as a current night end time 9701 and a current battery level 9702 as a current battery end level 9703, (2) estimating a new expected night length 9704 by calculating and filtering a current night length 9705 based on the current night start time 9301 and the current night end time 9701, (3) estimating a new expected efficiency 9706 by calculating and filtering a current efficiency 9707 based on current battery usage 9708 calculated from current battery start level 9303, current battery end level 9703, and the current night length 9705; and In step 9800, the software turns off the LED component and proceeding with step 9100.

Figure 14:
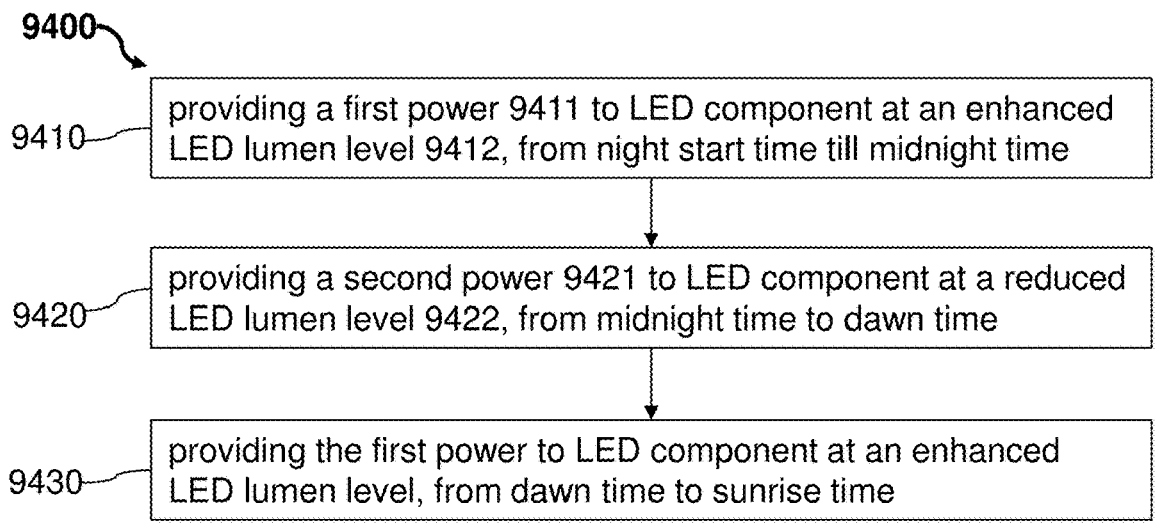
FIG. 14 is a flow chart demonstrating step 9400 of the intelligent mode according to an example embodiment.

In some embodiments, step 9400 further comprises the following steps, as shown in FIG. 14:

(a) step 9410, providing a first power 9411 to LED component at an enhanced LED lumen level 9412, from night start time till midnight time;

(b) step 9420, providing a second power 9421 to LED component at a reduced LED lumen level 9422, from midnight time to dawn time; and (c) step 9430, providing the first power to LED component at an enhanced LED lumen level, from dawn time to sunrise time.

Figure 15:
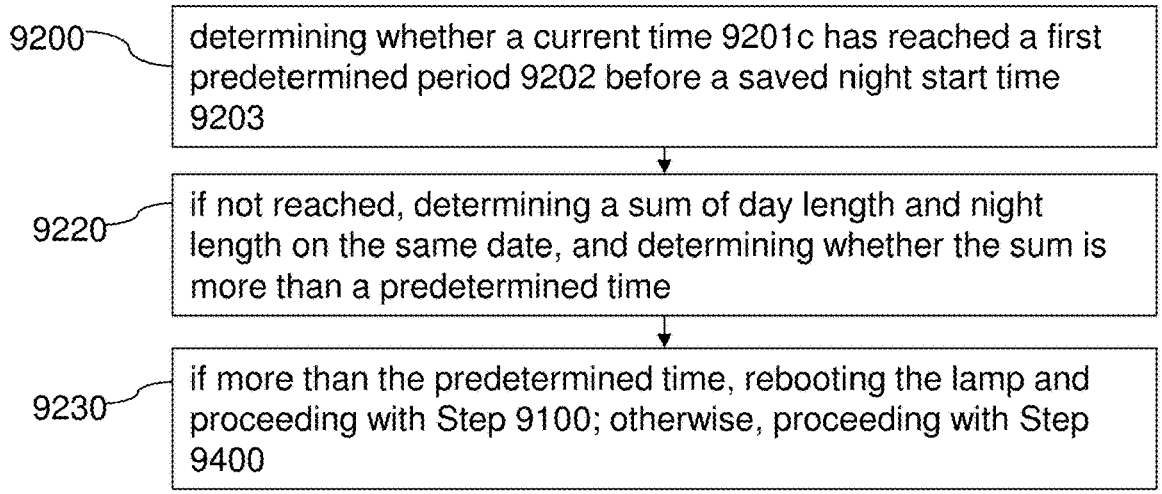
FIGS. 15-16 are flow chart demonstrating the additional step of the intelligent mode according to an example embodiment.

In some embodiments, step 9200 further comprises the following steps, as shown in FIG. 15:

(a) Step 9220, if a current time 9201c has not reached first predetermined period 9202, the software proceeds to determine a sum of day length and night length on the same date and determines whether the sum is more than a predetermined time; and (b) step 9230, if more than the predetermined time, the software reboots the lamp and proceeds to step 9100; otherwise, the software proceeds to step 9400.

Figure 16:
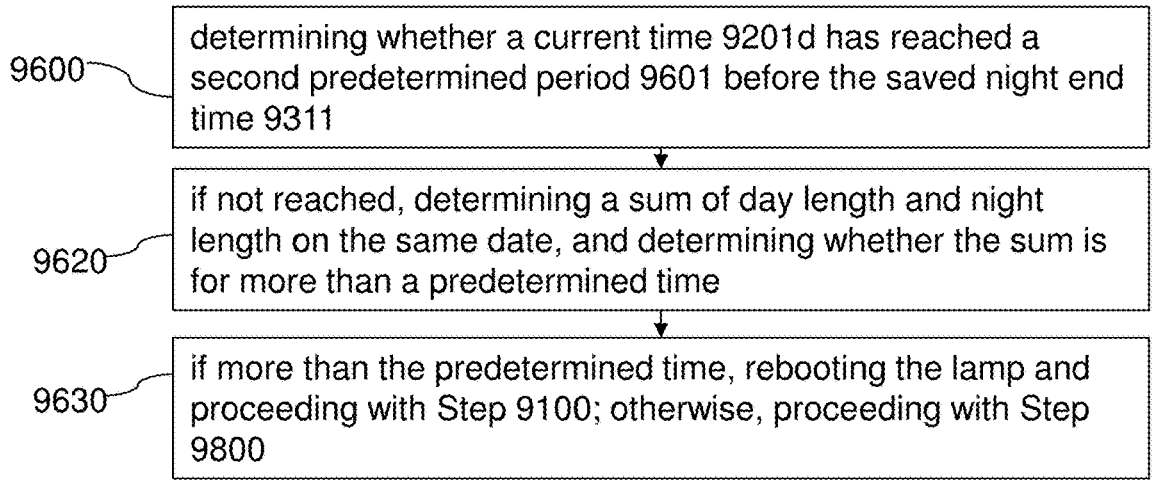

In some embodiments, step 9700 further comprises the following steps, as shown in FIG. 16:

(a) step 9620, if a current time 9201d has not reached second predetermined period 9601, the software proceeds to determine a sum of day length and night length on the same date and determines whether the sum is for more than a predetermined time; and (b) step 9630, if more than the predetermined time, the software reboots the lamp and proceeds to step 9100; otherwise, the software proceeds to step 9800.

Intelligent Mode 9000'

The example provided below serves as an illustrative demonstration or implementation and is not intended to be an exhaustive embodiment.

Figure 17A:
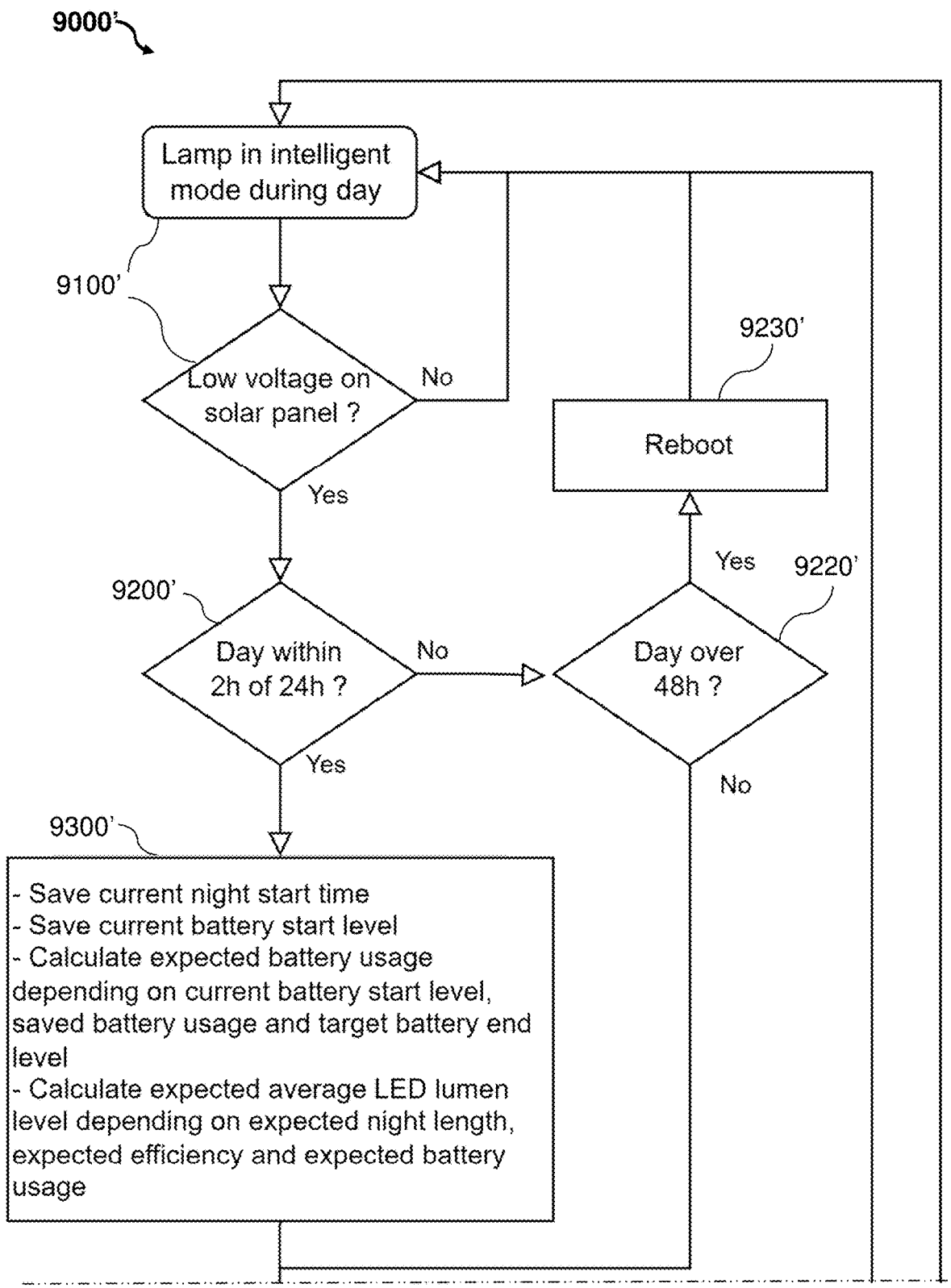
FIGS. 17A-C are breaking up figures of a flow chart, together demonstrating step 9400 of the intelligent mode according to another example embodiment.
Figure 17B:
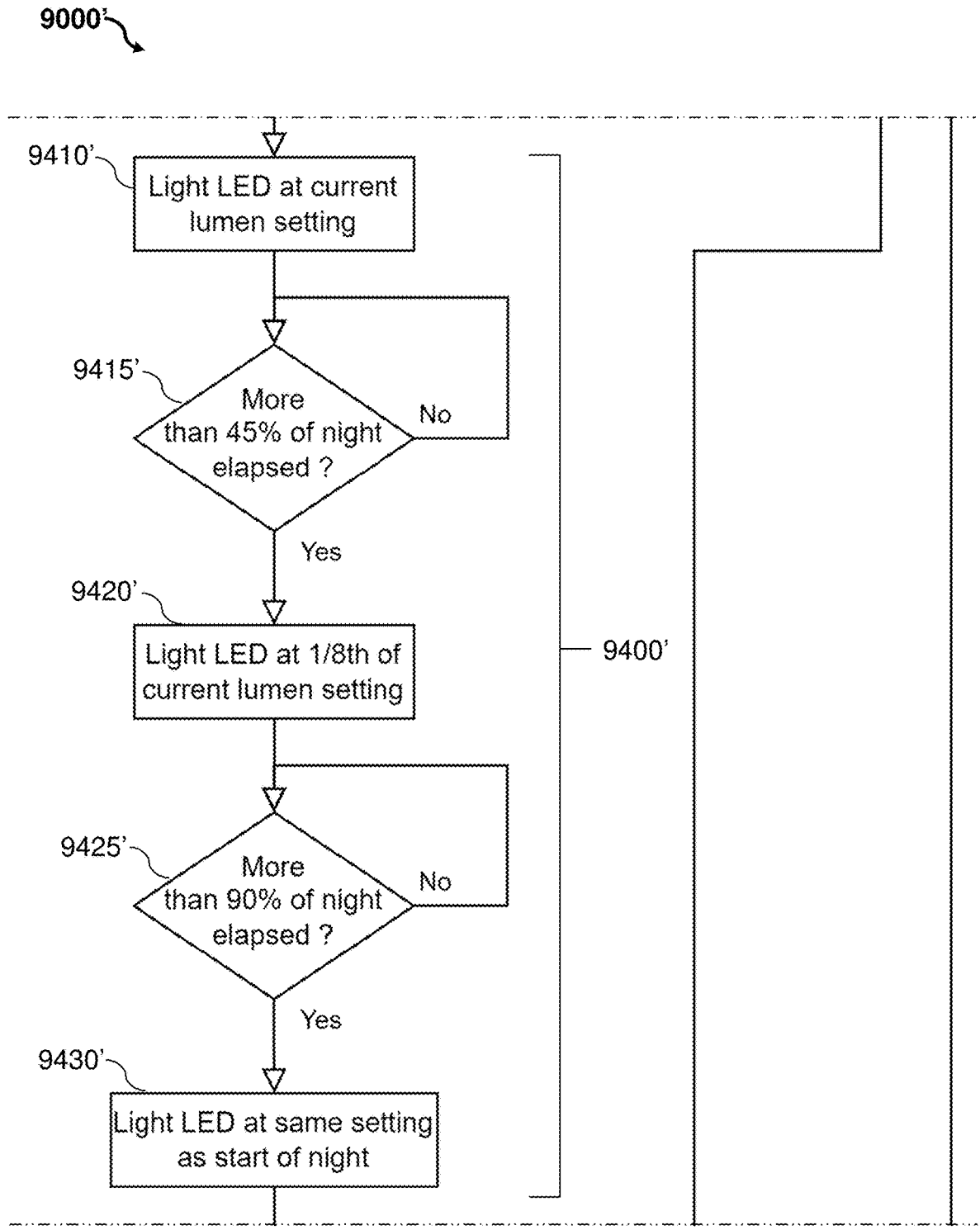
Figure 17C:
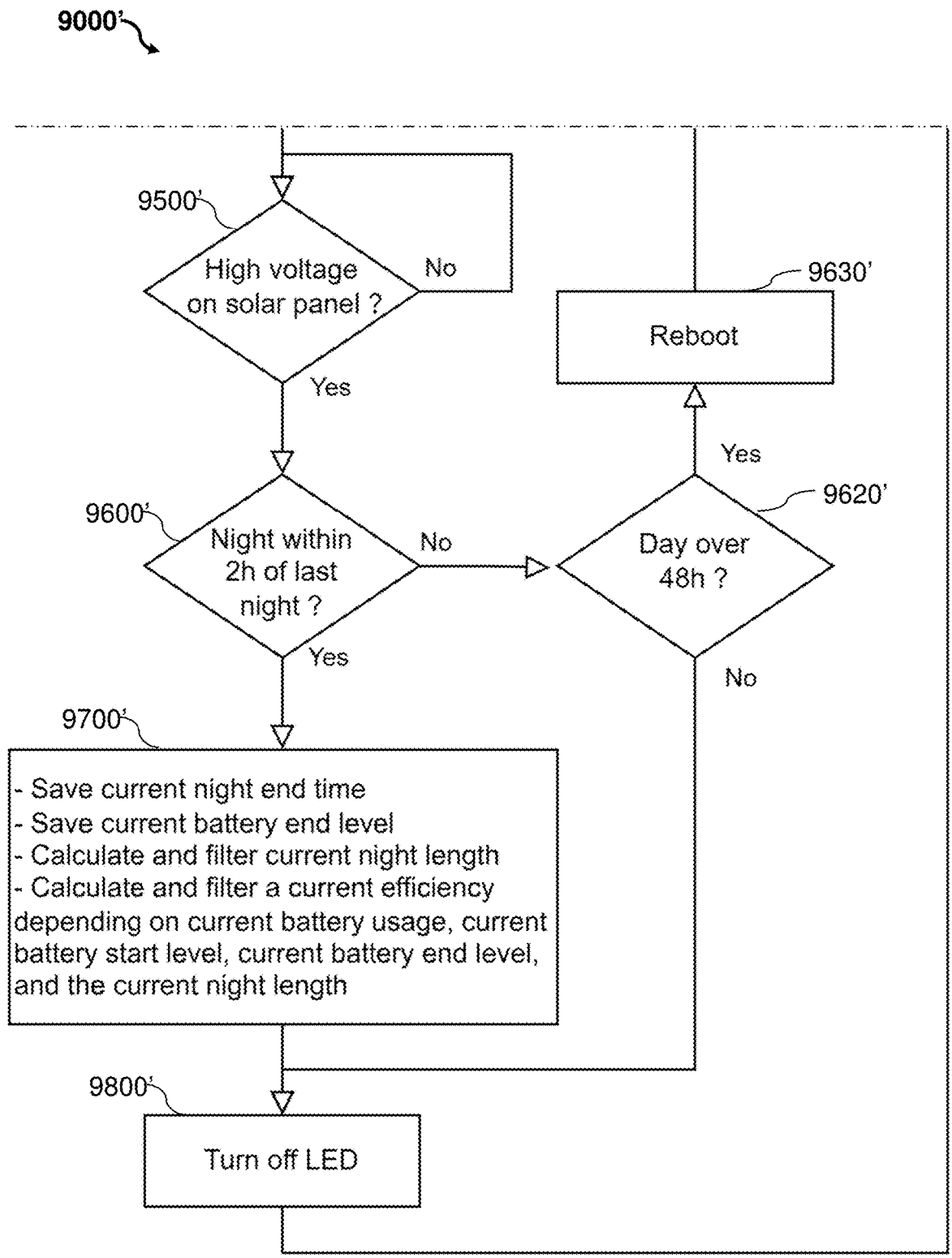

Now referring to FIGS. 17A-C, a flow chart 9000' illustrating the steps executed during the intelligent mode according to another example embodiment is shown. In this embodiment, the software executes the following steps.

In step 9100', the lamp is set in the intelligent mode and the solar panel collects sunlight energy during the day and produce an open voltage, and the software determines whether current voltage at solar panel component is lower than a pre-defined low voltage. By way of example, the pre-defined low voltage is a measured voltage at production of the open voltage of the solar panel at a 10 Lux luminance produced by an incandescent lamp at the surface of the solar panel.

If it is lower, the software proceeds to step 9200' to determine whether current time has reached a first predetermined period before a saved night start time. In this example, the first predetermined period is set to 24±2 hours (i.e., 22-26 hours) since the previously saved night start time. In other words, this step 9200' is to determine whether the current time falls been between 22 and 26 hours since the previously saved start of night.

If the current time has reached the first predetermined period, the software proceeds to step 9300'. If the current time has not reached the first predetermined period, the software proceeds to step 9220'.

In step 9300', the software performs the following:

(1) saving the current time as a current night start time and a current battery level as a current battery start level;

(2) calculating an expected battery usage (i.e., the battery usage that is expected to be consumed during the coming, current night) using one or more of the following parameters or values:

(iv) the current battery start level;

(ii) a saved battery end level; in this example, the saved battery end level is the battery end level of the previous night;

(iii) a saved battery usage; in this example, the saved battery usage is a saved value of the battery usage of the previous night'; and/or (iv) an target battery end level; in this example, the target battery end level is a pre-defined desired or ideal target value of the battery level at the end of the night. For example, the target battery end level can be 10%, 20%, 30%, 40%, 50%, 60%, 70%, 80%, 90% or more of the full battery level. In one implementation, the target value is about 35%.

(3) calculating an expected average LED lumen level by one or more of the following parameters:

(i) an expected night length calculated from the current night starttime and the saved (previous) night end time. In one example, the calculation is done by extrapolation based on one or multiple previously saved data (historical data). In one example, if the lamp has not been used before and there is no historical data (the first night), the expected length of night calculated becomes the expected night length (for the coming night). Otherwise, the calculated results of the expected night length are filtered using a low pass first order Infinite impulse response (IIR) filter, and the filtered values are used for next night's expected night length.

(ii) an expected efficiency. In one example, the expected efficiency is calculated based on the battery usage divided by (average lumen output of the previous night ('average lumen output') multiplied by night length of the last night ('saved night length')). In some embodiments, the expected efficiency is calculated using the formula below:

Expectedefficiency=savedbatteryusage÷(averalumenoutput×savednightlength)

In one example, if the lamp has not been used before and there is no historical data (the first night), the calculated efficiency becomes the expected efficiency (for the coming night). Otherwise, the calculated results are filtered using a low pass first order Infinite impulse response (IIR) filter, and the filtered values are used for the next night efficiency; and/or (iii) the expected battery usage calculated above.

In step 9400', the software provides power to LED component based on the expected average LED lumen level calculated above. Using the expected average LED lumen level (for example, 300 lumen), the software is programmed to automatically distribute the power to adjust the LED lumen level ('current lumen setting') so that it matches with the time when high luminance is needed. In this embodiment, in step 9410', the software provides a first power to LED component at an enhanced LED lumen level (for example, 400 lumen), from current night start time till midnight time. In some embodiments, the midnight time is pre-defined as the time when a certain percentage of the expected night length that has elapsed, such as 40-60%. In this embodiment, the midnight time is the time when 45% of the expected night length has elapsed. In some examples, if the expected average LED lumen level calculated is much higher than a predetermined value (such as the previous average lumen level of 300 lumen), the expected average LED lumen level can be further adjusted to previous average level (300 lumen) in order to save up extra energy, which allows for all night long lighting even with several subsequent days in a row of bad weather, and more generally a more desirable stable performance.

In step 9415', the software determines if the midnight time has passed, e.g., when more than 45% of the expected night length has elapsed. If yes, the software will proceed with step 9420', i.e., providing a second power to LED component at a reduced LED lumen level (for example, 200 lumen), from midnight time to dawn time. In some embodiments, the reduced LED lumen level is calculated by the expected average LED lumen level times a factor, such as 1/8. In some embodiments, the dawn time is pre-defined as the time when a certain percentage of the expected night length that has elapsed. In this embodiment, the dawn time is the time when 90% of the expected night length has elapsed.

In step 9425', the software determines if the dawn time has passed, e.g., when more than 90% of the expected night length has elapsed. If yes, the software will proceed with step 9430', i.e., providing the first power to LED component at the enhanced LED lumen level (for example, 400 lumen, which is the same as in step 9410'), from dawn time to sunrise time.

In step 9500', the software determines whether a current voltage at the solar panel component is higher than a pre-defined high voltage.

If higher, the software will proceed with step 9600', i.e., determining whether a current time has reached a second predetermined period before the saved night end time; In this example, the second predetermined period is set to 2 hours before the saved night end time.

If the current time has reached the second predetermined period, the software proceeds to step 9700'. If the time is not reached, the software proceeds to step 9620'.

In step 9700', the software performs the following:

(1) saving the current time as a current night end time and a current battery level as a current battery end level. In some embodiments, the current night end time will be stored in the memory and be used as the saved night end time for the next night.

(2) estimating a new expected night length by calculating and filtering a current night length based on the current night start time and the current night end time. In some examples, after the current night length has been calculated, the calculated value will be filtered using a low pass first order Infinite impulse response (IIR) filter, and the filtered values are used in the coming night.

(3) estimating a new expected efficiency ('current efficiency') by calculating and filtering a current efficiency based on current battery usage ('used energy') calculated from current battery start level, current battery end level, and the current night length ('night length'). In some examples, after the current efficiency has been calculated, the calculated value will be filtered using a low pass first order Infinite impulse response (IIR) filter, and the filtered values are used in the coming night (i.e., becomes an expected efficiency for the next night). In some embodiments, the current efficiency is calculated further based on wearing of components such as battery and converter.

In step 9800', the software turns off the LED component and proceeds with step 9100' for another day/night cycle.

In this embodiment, the software is configured to perform a sanity check against erratic detection of night/day transition induced by artificial lighting (e.g., car headlights, flashlight, etc.), which can be wrongly detected as night/day transition and can lead to failure to detect with certainty the actual transition. In some examples, this is done with one or more of the following steps.

As discussed above, in step 9200', if the current time has not reached the first predetermined period, the software proceeds to step 9220'. In some embodiments, the predetermined time is set as 0.5, 1, 2, 3, 4, or 5 hours away from sunset. In this example, the predetermined time in step 9200' is set at 2 hours away from sunset time. In such case, a significant deviation from the previous data will not be taken into account.

In step 9220', the software determines an entire day length or duration (sum of day length and night length on the same date), and determines whether the sum is more than a predetermined time (for example, 48 hours). If the sum is more than the predetermined time, the software reboots the lamp in step 9230' and proceeding with step 9100'; otherwise, the software proceeds with step 9400'. In other examples, the duration can be calculated by the difference between current night end time and previous night end time. For sake of clarity, "rebooting" the lamp refers to resetting the lamp to its initial setting/parameters that may be permanently saved in the MCU. In one implementation, all volatile memory are purged by power cycling the MCU, so as to effectively go back to factory defaults for all parameters.

Similarly, as discussed above, in step 9600', if the current time has not reached the second predetermined period, the software proceeds to step 9620'. In some embodiments, the second predetermined time is set as 0.5, 1, 2, 3, 4, or 5 hours away from sunrise. In this example, the predetermined time is set at 2 hours away from sunset time.

In step 9620', the software determines a sum of day length and night length on the same date, and determines whether the sum is more than a predetermined time (for example, 48 hours). If the sum is more than the predetermined time, the software reboots the lamp in step 9630' and proceeding with step 9100'; otherwise, the software proceeds with step 9700'.

In some embodiments, the device is provided with preset values when the device is brand new or after a reset/reboot. In some embodiments, the first night energy/battery usage is preset to half available energy/battery at start of first night.

In some embodiments, the night duration is assumed to be or preset at 12 hours on the first night (without calculation and filtering).

In some embodiments, efficiency factor is assumed to be equivalent to system midlife level. In some embodiments, the system needs 1 to 14 days to accumulate enough efficiency data to stabilize the value after turning on initially, depending on how far the default values deviate from the actual current conditions, e.g., depending on the weather, season, location and/or device/components wear such as wearing status of battery and/or converter.

The exemplary embodiments of the present invention are thus fully described. Although the description referred to particular embodiments, it will be clear to one skilled in the art that the present invention may be practiced with variation of these specific details. Hence this invention should not be construed as limited to the embodiments set forth herein.

Devices/systems/methods discussed within different figures can be added to or exchanged with methods in other figures. Further, specific numerical data values (such as specific quantities, numbers, categories, etc.) or other specific information should be interpreted as illustrative for discussing example embodiments. Such specific information is not provided to limit example embodiment.

For example, in certain embodiments, the solar powered lamp includes more than one LED components or other lighting elements.

For example, optional USB interfacing module is provided as alternative charging means for the battery, but other modules such as Lightning and micro USB etc. can be used.

For example, in some embodiments, the MCU further comprises self-assessment systems operatively connected with the components such as the battery component and converter component for evaluating and monitoring the current wear statuses of these components. The current wear statuses may become one of the additional parameters or values for calculating and predicting the efficiency of the lamp.

For example, the microcontroller contains processing units (e.g., microprocessors, ASICs, FPGAs, GPUs, CPUs, processing cores, or the like), one or more input/output (I/O) devices, one or more communication interfaces (e.g., USB, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces, and one or more communication buses for interconnecting these and various other components. In some examples, the one or more communication buses include circuitry that interconnects and controls communications between system components.

For example, the memory includes high-speed random-access memory, such as DRAM, SRAM, DDR RAM, or other random-access solid-state memory devices. In some examples, the memory includes non-volatile memory, such as one or more magnetic disk storage devices, optical disk storage devices, flash memory devices, or other non-volatile solid-state storage devices. The memory optionally includes one or more storage devices remotely located from the one or more processing units. The memory comprises a non-transitory computer readable storage medium. In some examples, the memory or the non-transitory computer readable storage medium of the memory stores the programs, modules and data structures, or a subset thereof including an optional operating system and one or more modules. The operating system includes procedures for handling various basic system services and for performing hardware dependent tasks.

What is claimed is:

1. An intelligent solar powered lamp, comprising:
a LED component;
a solar panel component;
a battery component;
a converter that operatively connects with the LED component, solar panel component and the battery component; and
a microcontroller that operatively connects with the battery component and electrically communicates with the converter, wherein the microcontroller comprises a memory that stores an executable, software program configured to control the operation of the lamp;
wherein the software program comprises an operating module that is configured to control the operation of the lamp in an intelligent mode by executing the following steps:
(1) determining whether a current voltage at solar panel component is lower than a pre-defined low voltage:
(2) if lower, determining whether a current time has reached a first predetermined period before a saved night start time:
(3) if reached,
(3.1) saving the current time as a current night start time and a current battery level as a current battery start level,
(3.2) calculating an expected battery usage by one or more of the following parameters:
the current battery start level;
a saved battery end level;
a saved battery usage; and/or
a target battery end level; and
(3.3) calculating an expected average LED lumen level by the following parameters:
an expected night length;
an expected efficiency; and/or
the expected battery usage from (3.2);
(4) providing power to LED component based on the expected average LED lumen level:
(5) determining whether a current voltage at the solar panel component is higher than a pre-defined high voltage;
(6) if higher, determining whether a current time has reached a second predetermined period before the saved night end time;
(7) if reached, (7.1) saving the current time from (6) as a current night end time and a current battery level as a current battery end level,
(7.2) estimating a new expected night length by calculating and filtering a current night length based on the current night start time and the current night end time,
(7.3) estimating a new expected efficiency by calculating and filtering a current efficiency based on current battery usage calculated from current battery start level, current battery end level, and the current night length; and
(8) turning off the LED component and proceeding with step (1).

2. The intelligent solar powered lamp of claim 1, wherein the converter is a MOSFET half-bridge based converter.

3. The intelligent solar powered lamp of claim 1, wherein the microcontroller further comprises a battery management system (BMS) that is configured to control the battery component, a LED driver system that is configured to control the LED component, and a solar panel driver system that is configured to control the solar panel component.

4. The intelligent solar powered lamp of claim 1, wherein the microcontroller further comprises a temperature sensor for measuring battery temperature of the battery component, such that the BMS is configured to control charging of the battery component in response to the battery temperature.

5. The intelligent solar powered lamp of claim 1, wherein the software program further comprises:
- a fuel gauge indicator system configured to indicate battery charging status of the battery component; and/or
- a dimming unit system configured to control lighting lumen output of the LED component.

6. The intelligent solar powered lamp of claim 1, further comprising:
- a housing that houses or supports the LED component, the solar panel component, the battery component, the converter, and the microcontroller;
- a base; and
- a neck portion extending away from the base;
- wherein the neck portion comprises a plurality of interlocking teeth, and the housing comprises a groove dial comprising a plurality of grooves adapted to interact with the plurality of interlocking teeth, such that when the housing is connected to the neck portion, each of the interlocking teeth mates with one of the groove to secure the position of the housing relative to the base.

7. The intelligent solar powered lamp of claim 6, wherein the housing further comprises a front cap opening, and the intelligent solar powered lamp further comprises a filter mount attachable to the front cap opening, wherein the filter mount comprises a slot to receive at least one filter.

8. The intelligent solar powered lamp of claim 1, wherein the software program further comprises a Maximum Power Point Tracking (MPPT) system configured to maximize solar panel energy collection by the solar panel component.

9. The intelligent solar powered lamp of claim 8, wherein the MPPT system executes the following steps:
- (a) determining whether sunlight is detected by the solar panel;
- (b) if detected, decreasing working voltage of the solar panel component;
- (c) determining whether charging power of the battery component is increased;
- (d) if increased, proceeding with step (b); otherwise, proceeding with step (e);
- (e) determining whether sunlight is still detected by the solar panel;
- (f) if detected, increasing the working voltage; otherwise, stop charging the battery;
- (g) determining whether the charging power is increased;
- (h) if increased, proceeding with step (f), otherwise, proceeding with step (i);
- (i) determining if sunlight is still detected; and
- (j) if detected, proceeding with step (b); otherwise, stop charging the battery, such that solar panel energy collection is maximized.

10. The intelligent solar powered lamp of claim 1, further comprising a button that operatively connects with the microcontroller, wherein the software program is further configured to allow the lamp to be switchable between an intelligent mode that optimizing LED lumen level in response to at least battery usage, a preset usage mode that allows a user to manually control the operation or to customize the parameters of the lamp and an anti-tamper mode that prevents a user to change current setting of the lamp.

11. The intelligent solar powered lamp of claim 10, wherein the software program further executes the following steps:
- (i) proceeding with the intelligent mode and determining whether the button is shortly pressed or prolongedly pressed and released afterwards;
- (ii) if shortly pressed, proceeding with the preset usage mode; if prolongedly pressed and released afterwards, proceeding with the anti-tamper mode;
- (iii) determining whether the button is further prolongedly pressed and released afterwards; and
- (iv) if prolongedly pressed and released afterwards, proceeding with step (i).

12. The intelligent solar powered lamp of claim 11, wherein the software program further comprising a step of: operating an indicator to blink, if step (ii) and/or step (iv) is prolongedly pressed until released.

13. The intelligent solar powered lamp of claim 1, wherein step (4) further comprising steps of:
- (4.1) providing a first power to LED component at an enhanced LED lumen level, from night start time to midnight time;
- (4.2) providing a second power to LED component at a reduced LED lumen level, from midnight time to dawn time; and
- (4.3) providing the first power to LED component at an enhanced LED lumen level, from dawn time to sunrise time.

14. The intelligent solar powered lamp of claim 1, wherein step (3) further comprising steps of:
- if not reached, (3.4) determining a sum of day length and night length on a same date, and determining whether the sum is more than a predetermined time;
- (3.5) if more than the predetermined time, rebooting the lamp and proceeding with step (1);
- otherwise, proceeding with step (4).

15. The intelligent solar powered lamp of claim 1, wherein step (7) further comprising steps of:
- if not reached, (7.7) determining a sum of day length and night length on a same date, and determining whether the sum is for more than a predetermined time;
- (7.8) if more than the predetermined time, rebooting the lamp and proceeding with step (1);
- otherwise, proceeding with step (8).

\* \* \* \* \*